United States Patent
Hong et al.

(10) Patent No.: US 9,074,386 B2
(45) Date of Patent: Jul. 7, 2015

(54) CLEANING ROBOT AND UNDERWATER SEDIMENT CLEANING APPARATUS AND METHOD

(75) Inventors: Young Jin Hong, Suwon-Si (KR); Mun Jik Lee, Pohang-Si (KR); Jung Woo Lee, Seoul (KR); Jong Geol Kim, Pohang-Si (KR); Jin Ho Suh, Pohang-Si (KR)

(73) Assignee: KOREA INSTITUTE OF ROBOT & CONVERGENCE, Gyeongbuk (KR)

( * ) Notice: Subject to any disclaimer, the term of this patent is extended or adjusted under 35 U.S.C. 154(b) by 93 days.

(21) Appl. No.: 13/817,630

(22) PCT Filed: Jan. 28, 2011

(86) PCT No.: PCT/KR2011/000598
§ 371 (c)(1),
(2), (4) Date: Feb. 19, 2013

(87) PCT Pub. No.: WO2012/023676
PCT Pub. Date: Feb. 23, 2012

(65) Prior Publication Data
US 2013/0151061 A1    Jun. 13, 2013

(30) Foreign Application Priority Data
Aug. 20, 2010   (KR) .......................... 10-2010-0080815

(51) Int. Cl.
*E04H 4/16*       (2006.01)
*G05D 1/02*       (2006.01)
(Continued)

(52) U.S. Cl.
CPC ................ *E04H 4/1654* (2013.01); *B08B 9/08* (2013.01); *E02F 3/8866* (2013.01); *E02F 3/907* (2013.01); *E02F 3/9281* (2013.01); *E02F 7/06* (2013.01); *G05D 1/0278* (2013.01); *Y10S 901/01* (2013.01); *Y10S 901/40* (2013.01)

(58) Field of Classification Search
USPC .................. 701/25, 21; 15/1.7; 134/60; 901/1
See application file for complete search history.

(56) References Cited

U.S. PATENT DOCUMENTS 5,197,158 A * 3/1993 Moini ............................... 15/1.7
5,245,723 A * 9/1993 Sommer ........................... 15/1.7
(Continued)

FOREIGN PATENT DOCUMENTS

JP    06-285448 A     10/1994
JP    06285448 a   *  10/1994   .............. B08B 9/087
(Continued)

OTHER PUBLICATIONS

International Search Report of PCT/KR2011/000598 mailed on Oct. 18, 2011.

*Primary Examiner* — Mary Cheung
*Assistant Examiner* — Brian P Sweeney
(74) *Attorney, Agent, or Firm* — McCarter & English, LLP; David R. Burns

(57) ABSTRACT

A cleaning robot capable of cleaning a water tank in an unmanned manner and an underwater sediment cleaning apparatus and method are provided. The cleaning robot includes a body put into a water tank, a driver supporting the body and moving the body, a suction part arranged in front of the body and sucking contaminated water containing sediment in the water tank, and a tilting part supported by the body to support the suction part and rotating the suction part on an axis corresponding to the direction across the moving direction of the body.

8 Claims, 15 Drawing Sheets

(51) Int. Cl.
*B08B 9/08* (2006.01)
*E02F 3/88* (2006.01)
*E02F 3/90* (2006.01)
*E02F 3/92* (2006.01)
*E02F 7/06* (2006.01)

(56) References Cited

U.S. PATENT DOCUMENTS

| | | | | |
|---|---|---|---|---|
| 5,640,982 | A | * | 6/1997 | Landry et al. ............. 134/167 R |
| 6,017,400 | A | * | 1/2000 | Clark et al. ..................... 134/21 |
| 7,505,364 | B2 | * | 3/2009 | Polvani ........................ 367/131 |
| 2004/0021439 | A1 | | 2/2004 | Porat et al. |
| 2010/0307545 | A1 | * | 12/2010 | Osaka et al. .................. 134/198 |

FOREIGN PATENT DOCUMENTS

| | | |
|---|---|---|
| JP | 06-081677 U | 11/1994 |
| JP | 2001-029910 A | 2/2001 |
| JP | 2002-312035 A | 10/2002 |
| JP | 2004-243202 A | 9/2004 |
| KR | 10-2003-0080635 A | 10/2003 |
| KR | 10-2005-0123079 A | 12/2005 |
| KR | 20-0411862 A | 3/2006 |
| KR | 10-2006-0075581 A | 7/2006 |
| KR | 10-2009-0132693 A | 12/2009 |

* cited by examiner

CLEANING ROBOT AND UNDERWATER SEDIMENT CLEANING APPARATUS AND METHOD

RELATED APPLICATIONS

This application is a 35 U.S.C. 371 national stage filing of International Application No. PCT/KR2011/000598, filed Jan. 28, 2011, which claims priority under 35 U.S.C. 365 to Korean Patent Application Serial No. 10-2010-0080815, filed Aug. 20, 2010. The entire contents of each of the aforementioned applications are incorporated herein by reference.

TECHNICAL FIELD

The present invention relates to a cleaning robot and an underwater sediment cleaning apparatus and method and, more particularly, to a cleaning robot and an underwater sediment cleaning apparatus and method for cleaning sediment accumulated in a water tank.

BACKGROUND ART

Water is used for various industrial facilities and production facilities, and thus there are a water tank reserving water and facilities for administrating the water tank. Since sediment is accumulated in the water tank, the water tank requires to be periodically cleaned in order to manage water quality and prevent equipment using water from being damaged.

A conventional water tank cleaning method includes an operation of discharging water reserved in the water tank, an operation of removing sediment from the water tank and an operation of storing water in the water tank.

The removal operation in the conventional water tank cleaning method is manually performed by operators. Specifically, the removal operation is carried out in such a manner that the operators enter the drained water tank, accumulate sediment using a push rod, a bulldozer, etc., suck the accumulated sediment and discharge the sediment to the outside of the water tank.

SUMMARY OF INVENTION

Technical Problem

This manually performed water tank cleaning method requires a long time for cleaning. Furthermore, it has to stop the operations of facilities using the water of the water tank while the water tank is cleaned. These problems deteriorate production efficiency of industrial facilities or production facilities using the water tank.

Moreover, since the sediment accumulated in the water tank used for the industrial facilities or production facilities contains toxic materials in many cases, the conventional cleaning method may cause safety accidents when the operators entering the water tank are exposed to the toxic materials.

Furthermore, the conventional cleaning method does not recycle drained water to result in waste of water resources.

Solution to Problem

A cleaning robot according to an aspect of the present invention comprises a body put into a water tank, a driver supporting the body and moving the body, a suction part arranged in front of the body and sucking contaminated water containing sediment in the water tank, and a tilting part supported by the body to support the suction part and rotating the suction part on an axis corresponding to the direction across the moving direction of the body.

The suction part may comprise a suction tube opened to the front of the body, a screw arranged in a direction to the suction tube, located at the front of the suction tube and having screw threads tilted to the suction tube, and a rotary motor connected to the shaft of the screw to rotate the screw.

The cleaning robot may further comprise a contaminated water discharge pipe connected with the suction tube to form a path for discharging the contaminated water sucked through the suction tube and a swivel joint provided between the contaminated water discharge pipe and the suction tube.

The cleaning robot may further comprise a suction pump arranged between the suction tube and the swivel joint and a pump hanger set in the body to elastically support the suction pump.

The tilting part may comprise a support supporting the suction part with its front end, being rotatably combined with the body and rotating from the body on a first supporting pin provided in a direction across the moving direction of the body, a first link joint having a first end connected to the support through a first link pin, a second link joint having a first end connected to a second end of the first link joint through a second link pin and a second end connected to the body through a second supporting pin, being rotatably combined with the body and rotating on the second supporting pin, and a tilt cylinder having an output terminal connected to the second link pin.

The cleaning robot may further comprise a tilt limit sensing part arranged behind the support to sense the lower limit point and the upper limit point of the support.

The cleaning robot may further comprise a location information sensing part supported by the body and exposed from the surface of water in the water tank.

The location information sensing part may comprise a GPS sensor controller supported by the body and a GPS antenna connected to the GPS sensor controller and located above the GPS sensor controller.

The cleaning robot may further comprise a buoy provided between the body and the GPS sensor controller and floating on the surface of the water in the water tank, and retractable support supporting the GPS sensor controller and the GPS antenna from the body and combined with the buoy, the retractable support having a length increasing or decreasing according to the distance between the body and the buoy.

The cleaning robot may further comprise a balloon connected with the body and a supply pipe connected to the balloon to supply a gas to the balloon.

The cleaning robot may further comprise a neutral buoy provided to the body to maintain neutral buoyancy.

The cleaning robot may further comprise a bumper part installed in front of the suction part.

The bumper part may comprise bumper wheels arranged to roll on an obstruction appearing in front of the body and a supporting frame supporting the bumper wheels.

The supporting frame may be rotatably combined with the body and rotating on an axis corresponding to the direction across the moving direction of the body, and the cleaning robot may further comprise a rotation angle sensing part arranged behind the supporting frame to sense the rotation angle of the supporting frame.

An underwater sediment cleaning apparatus according to another aspect of the present invention comprises a cleaning robot put into a water tank to suck contaminated water containing sediment in the water tank, a sediment separator located outside the water tank, receiving the contaminated water from the cleaning robot, filtering the sediment from the contaminated water and discharging clean water obtained by filtering the sediment from the contaminated water to the water tank, and a controller located outside the water tank and connected to the cleaning robot to control the operation of the cleaning robot.

The sediment separator may comprise a tank having a first side connected with a contaminated water discharge pipe extended from the cleaning robot, an intake pipe having a first end connected to a second side of the tank and a second end opened to the water tank to allow the clean water to flow into the water tank, and a filter set inside the tank to filter the sediment from the contaminated water flowing to the intake pipe.

The underwater sediment cleaning apparatus may further comprise a sediment discharge pipe having a first end connected to the first side of the tank and a second end opened to the outside of the tank.

The controller may be installed in an operating room which is located outside the water tank and movable.

The controller may comprise a power supply connected to the cleaning robot through a power cable to provide power supplied from an external supply source to the cleaning robot, a communication unit connected to the cleaning robot through a communication cable to transmit/receive data to/from the cleaning robot, and a central processing unit controlling the power supplied to the cleaning robot and processing the data transmitted/received to/from the cleaning robot.

The controller may further comprise a wheel driver controlling the moving operation of the cleaning robot, a screw driver controlling the rotation speed and rotation direction of a screw included in the cleaning robot, a tilt driver controlling the tilting angle of a tilting part included in the cleaning robot, and a pump driver controlling the operation of a suction pump included in the cleaning robot. The wheel driver, the screw driver, the tilt driver and the pump driver may be connected to the central processing unit, and the central processing unit may process control commands generated from wheel driver, the screw driver, the tilt driver and the pump driver.

The controller may further comprise a camera unit controlling an image captured by a camera included in the cleaning robot, a light unit controlling the brightness of a light included in the cleaning robot, a sensor unit controlling a sensing signal generated from sensors included in the cleaning robot, and an automatic cleaning unit receiving location information from the cleaning robot and controlling the location of the cleaning robot. The camera unit, the light unit, the sensor unit and the automatic cleaning unit may be connected to the central processing unit, and the central processing unit may process control commands generated from the camera unit, the light unit, the sensor unit and the automatic cleaning unit.

The underwater sediment cleaning apparatus may further comprise an operation console set in a bag carried by an operator, connected to the controller and allowing the operator to operate the cleaning robot.

The operation console may comprise a camera switch turning on/off the camera included in the cleaning robot, a brightness controller controlling the brightness of the light include in the cleaning robot, a status lamp indicating statuses of the sensors included in the cleaning robot, a display displaying the image captured by the camera, the route of the cleaning robot and the location of the cleaning robot, a mode selection switch for selecting one of a manual cleaning mode and an automatic cleaning mode of the cleaning robot, a screw switch for controlling the rotation speed and rotation direction of the screw included in the cleaning robot, a screw tilt joystick controlling the tilting angle of the screw, a pump switch turning on/off the suction pump included in the cleaning robot, a driving joystick steering the cleaning robot, a speed control switch for controlling the moving speed of the cleaning robot, and an emergency stop switch for stopping the cleaning unit.

The underwater sediment cleaning apparatus may further comprise a generator generating the power supplied to the controller and a compressor connected to a balloon included in the cleaning robot to inject a gas into the balloon.

An underwater sediment cleaning method according to another aspect of the present invention comprises a preparation step of putting a cleaning robot into a water tank and preparing cleaning the water tank, a suction step of sucking contaminated water containing sediment in the water tank by means of the cleaning robot moving in the water tank, a discharging step of discharging the contaminated water to a tank arranged outside the water tank, and filtering step of discharging the sediment contained in the contaminated water to the outside of the tank and making clean water obtained by filtering the sediment from the contaminated water flow into the water tank.

The preparation step may comprise the steps of setting the whole area of the water tank, setting a moving route of the cleaning robot in the whole area of the water tank, controlling the space between neighboring route parts of the moving route of the cleaning robot to set a degree of precision of cleaning the water tank, and selecting one of the automatic cleaning mode and the manual cleaning mode.

An automatic cleaning operation according to selection of the automatic cleaning mode may comprise a control step of receiving location information from the cleaning robot and controlling the location of the cleaning robot, a moving step of moving the cleaning robot along the route, a target point arrival determination unit of determining whether the cleaning robot arrives at a target point, and a cleaning completion determination step of determining whether the cleaning robot reaches a final target point.

The control step may comprise the steps of receiving first location information from a GPS sensor included in the cleaning robot and acquiring second location information from a encoder included in the cleaning robot, applying the first location information and the second location information to extended Kalman filter to correct the current location of the cleaning robot, calculating a target point which has to be tracked by the cleaning robot from the current location of the cleaning robot, calculating a difference between the current location of the cleaning robot and the target point, and calculating speed values of left and right wheels of the cleaning robot based on the calculated difference.

When the cleaning robot does not reach the target point in the target point arrival determination step, the cleaning method may further comprise calculating the current load of the cleaning robot and comparing the current load of the cleaning robot with an optimal load of the cleaning robot to detect the load of the cleaning robot.

The optimal load of the cleaning robot may be calculated based on the current consumed by the cleaning robot, the speed of the wheels revolving when the cleaning robot is driven and a variation in the location of the cleaning robot.

A detour of the cleaning robot is generated when the current load of the cleaning robot exceeds the optimal load.

The operation of generating the detour of the cleaning robot may comprise the steps of detecting a target point at which the cleaning robot cannot arrive from the current location, removing the detected target point from the route of the cleaning robot, generating new target point candidates at which the cleaning robot can arrive from the current location, and selecting a new target point from the generated new target point candidates.

A moving route of the cleaning robot may be secured when the current load of the cleaning robot is less than the optimal load.

The operation of securing the moving route of the cleaning robot may comprise the steps of moving the cleaning robot forward and moving the cleaning robot backward to return the cleaning robot to the position before being moved forward, and the step of moving the cleaning robot forward and the step of returning the cleaning robot may be repeated for a predetermined operating time.

When the cleaning robot cannot be moved forward, the cleaning method may further comprise the steps of moving the cleaning robot forward while turning the cleaning robot left or right and moving the cleaning robot backward to return the cleaning robot to the position before being moved forward, and the step of moving the cleaning robot forward and the step of returning the cleaning robot may be repeated for a predetermined operating time.

When the cleaning robot cannot be turned left or right or moved forward, the cleaning method may further comprise the step of moving the cleaning robot backward to a position behind the position before being moved forward, and the step of moving the cleaning robot forward and the step of moving the cleaning robot backward may be repeated for the predetermined operating time.

Advantageous Effects of Invention

The cleaning robot and underwater sediment cleaning apparatus and method according to the present invention can protect operators from exposure to toxic materials contained in sediment accumulated in the water tank so as to prevent accidents from happening.

Furthermore, the cleaning robot and underwater sediment cleaning apparatus and method according to the present invention can allow the water tank to be used even when the water tank is being cleaned, and thus water tank utilization efficiency can be improved.

Moreover, the cleaning robot and underwater sediment cleaning apparatus and method according to the present invention can filter contaminated water to generate clean water to thereby save water resources.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, an embodiment of the present invention will be described below with reference to the accompanying drawings.

Figure 1:
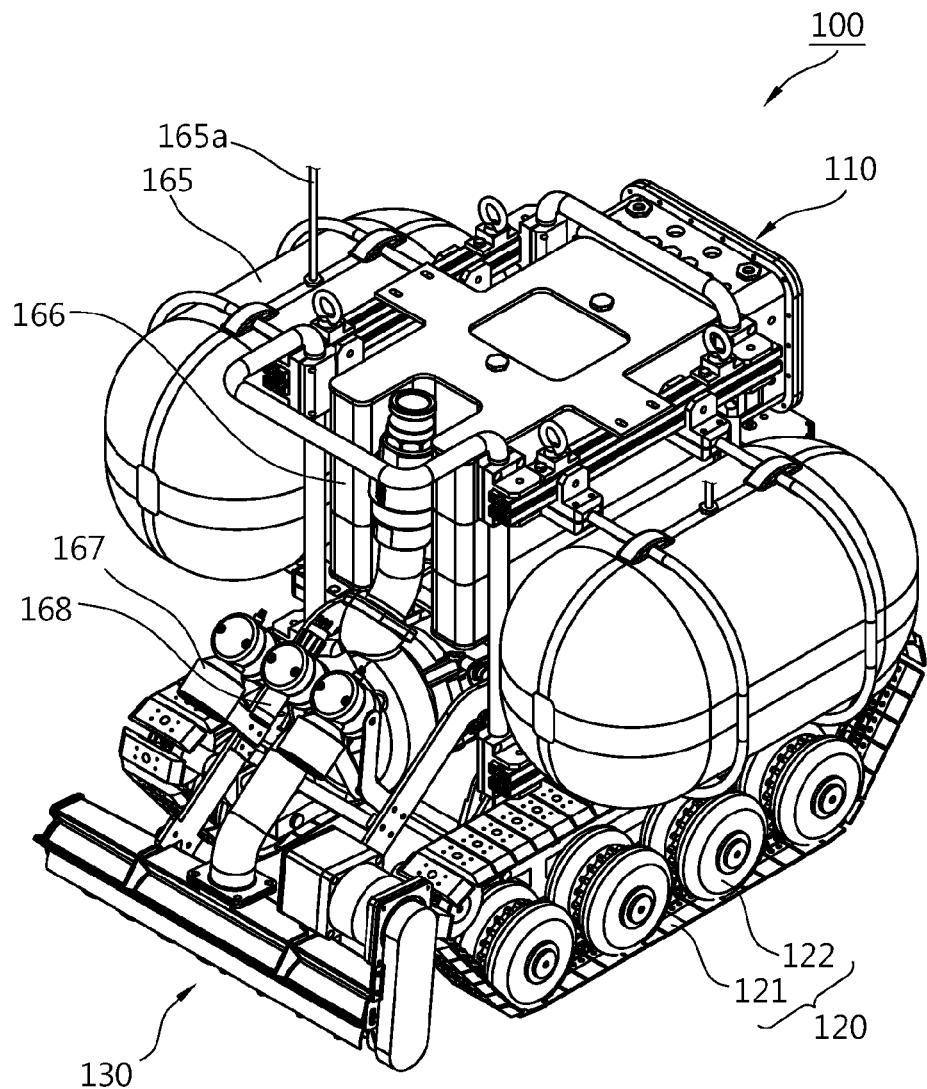
FIG. 1 is a perspective view of a cleaning robot according to an embodiment of the present invention.

FIG. 1 is a perspective view of a cleaning robot 100 according to an embodiment of the present invention.

Referring to FIG. 1, the cleaning robot 100 includes a body 110, a driver 120, a suction part 130, and a tilting part 140.

The driver 120 supports and drives the body 110 and includes a caterpillar 121 and a plurality of wheels 122.

The caterpillar 121 allows the body 110 to show excellent running performance even in a poor operating environment such as the bottom of a water tank, which has an uneven surface or is covered with mud. The shoes of the caterpillar 121 may be made of one of reinforced plastic, urethane and stainless steel and a component such as spikes can be additionally attached to the caterpillar 121.

The caterpillar 121 generally uses shoes made of reinforced plastics. If the bottom of the water tank is formed of synthetic resin such as a tarpaulin or rubber, the caterpillar 121 can use urethane shoes in order to minimize damage of the bottom of the water tank. When the bottom of the water tank is covered with mud, the caterpillar 121 can use stainless steel shoes to secure the running performance of the body 110 and additionally use spikes attached to the shoes.

The plurality of wheels 122 support the caterpillar 121. The wheels 122 maintain the grip of the caterpillar 121 even when the caterpillar 121 runs on the uneven surface of the bottom of the water tank. The wheels 122 are configured to absorb shock transferred from the uneven surface of the bottom of the water tank and buffer the load of the body 110. That is, suspensions (not shown) are respectively provided to shafts of the wheels 122 and urethane having adjusted hardness can be molded and used for the shafts.

The suction part 130 is arranged in front of the body 110 to suck contaminated water containing sediment in the water tank.

Figure 2:
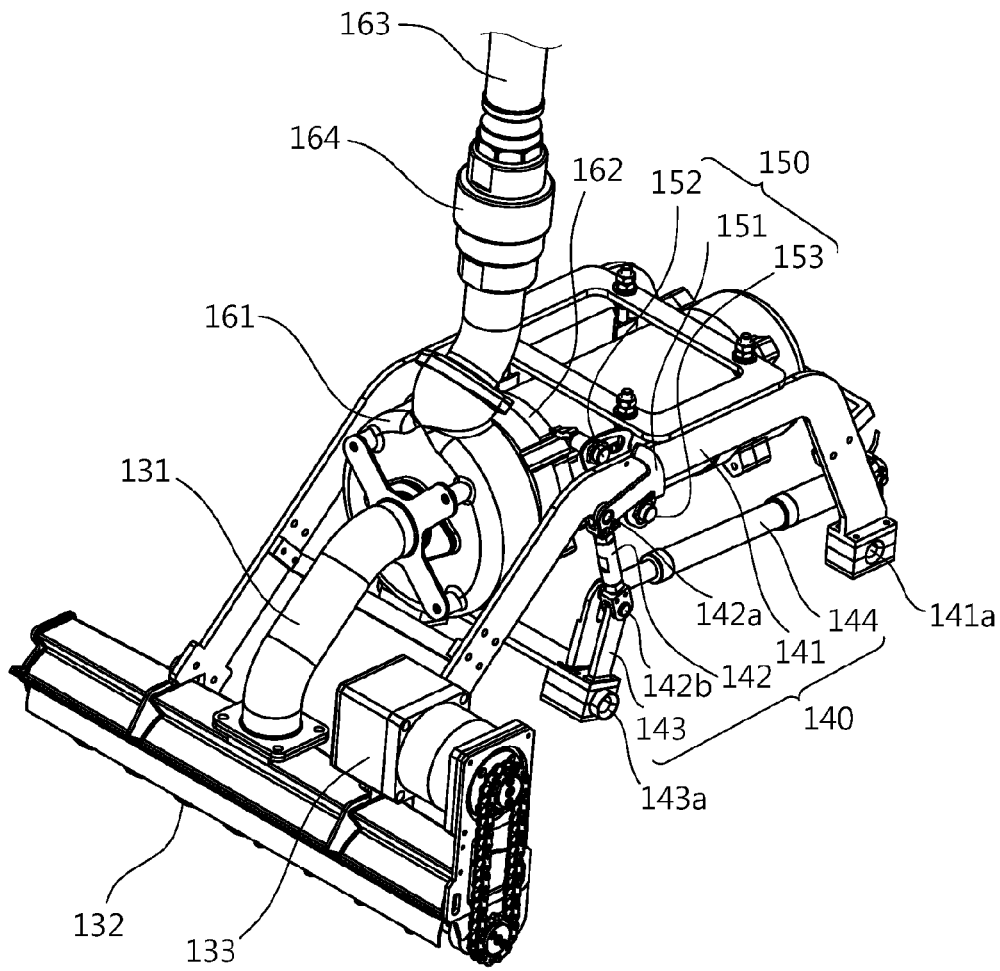
FIG. 2 is a perspective view of part of the cleaning robot shown in FIG. 1.
Figure 3:
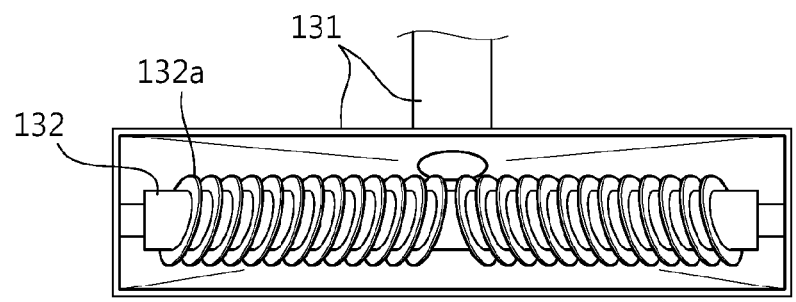
FIG. 3 is a bottom view of part of a suction part of the cleaning robot shown in FIG. 1.

FIG. 2 is a perspective view of part of the cleaning robot shown in FIG. 1 and FIG. 3 is a bottom view of part of the suction part 130 of the cleaning robot 100 shown in FIG. 1.

Referring to FIGS. 2 and 3, the suction part 130 includes a suction tube 131, a screw 132 and a rotary motor 133. The suction tube 131 may be configured such that one end thereof is opened to the front of the body 110 and the other end is formed in a shape that comes into closely contact with the bottom of the water tank and is extended to a direction to the moving direction of the body 110 to scrape sediment accumulated on the bottom of the water tank as the body 110 moves. In an alternative embodiment, one end of the suction tube 131 may be combined with a separate scraper opened to a direction across the moving direction of the body 110.

The screw 132 is arranged in a direction to the suction tube 131 at the front of the body 110. The screw 132 has screw threads 132a arranged at both sides of the suction tube 131 and tilted to the suction tube 131. The screw threads 132a crush the sediment accumulated on the bottom of the water tank such that the sediment can be smoothly sucked through the suction tube 131.

The screw 132 can be made of stainless steel when the sediment is not easily scraped off the bottom of the water tank due to its high viscosity and a brush made of nylon or urethane can be used to remove the sediment when the sediment is easily scraped off the bottom of the water tank due to its low viscosity.

The rotary motor 133 is connected to the screw 132 through a power transmission means such as a chain, a timing belt or the like. The rotary motor 133 rotates the screw 132 forward such that sediment dispersed to both sides of the suction tube 131 can be accumulated before the suction tube 131. On the contrary, the rotary motor 133 rotates the screw 132 reversely such that particles which are located in front of the suction tube 131 and obstructed suction of the sediment can be moved to the outside of the screw 132.

The tilting part 140 supports the suction part 130 against the body 110 and rotates the suction part 130 on an axis corresponding to a direction across the moving direction of the body 110. The tilting part 140 includes a support 141, a first link joint 142, a second link joint 143, and a tilt cylinder 144.

The support 141 supports the suction part 130 with its front end. The support 141 is rotatably combined with the body 110 and rotates on a first supporting pin 141a provided in a direction across the moving direction of the body 110.

One end of the first link joint 142 is connected to the support 141 by means of a first link pin 142a and one end of the second link joint 143 is connected to the other end of the first link joint 142 by means of a second link pin 142b. The other end of the second link joint 143 is connected to the body 110 through a second supporting pin 143a. The second link joint 143 is rotatably combined with the body 110 and rotates on the second supporting pin 143a. The tilt cylinder 144 has an output terminal connected to the second link pin 142b. The tilt cylinder 144 moves the second link pin 142b forward and backward such that the suction part 130 supported by the support 141 can rotate on the first supporting pin 141a.

The tilting part 140 controls a sediment suction rate. That is, the tilting part 140 can increase the suction rate by narrowing the distance between the bottom of the water tank and the suction part 130 and decrease the suction rate by widening the distance between the bottom of the water tank and the suction part 130.

Here, a tilt limit sensing part 150 that senses the upper limit and lower limit of the support 141 is arranged behind the support 141 to prevent the suction part 130 from excessively tilting. The tilt limit sensing part 150 includes a tilt loader 151 combined with the back end of the support 141 and tilted with the support 141, a lower limit sensor 152 located above the tilt loader 151, and an upper limit sensor 153 arranged under the tilt loader 151.

The tilt limit sensing part 150 can sense the lower limit point and the upper limit point of the support 141 to prevent the suction part 130 from excessively tilting.

Meanwhile, the cleaning robot 100 includes a suction pump 161, a pump hanger 162, a contaminated water discharge pipe 163, and a swivel joint 164.

The suction pump 161 is placed on the body 110 and connected to the other end of the suction tube 131. The suction pump 161 sucks the sediment accumulated before the suction tube 131 through the suction tube 131.

The pump hanger 162 hangs the suction pump 161 on the body 110 such that the suction pump 161 is supported by the body 110. An elastic member such as rubber, coil spring or the like may be provided to the connecting portion of the pump hanger 162 and the body 110. The elastic member prevents shock caused by vibrations generated from the operation of the suction pump 161 and moving of the body 110 from being transferred to the body 110 and the suction pump 161.

The contaminated water discharge pipe 163 has a first end connected with the suction tube 131 and a second end extended to the outside of the water tank. The contaminated water discharge pipe 163 forms a contaminated water discharge route through which contaminated water sucked through the suction tube 131 can be discharged to the outside of the water tank.

The swivel joint 164 is provided between the suction tube 131 and the contaminated water discharge pipe 163. The swivel joint 164 prevents the contaminated water discharge pipe 163 from turning along the suction tube 131 when the body 110 moves, particularly, when the body 110 turns, and thus the contaminated water discharge pipe 163 is not twisted.

As described above, the suction pump 161 is hung on the pump hanger 162 and combined with the body 110. In an alternative embodiment, the suction pump 161 may be located outside the water tank and connected to the contaminated water discharge pipe 163, which is not shown.

The cleaning robot 100 includes a balloon 165 and a supply pipe 165a, shown in FIG. 1, as means for floating the body 110 located inside the water tank on the surface of the water in the water tank.

Referring back to FIG. 1, the balloon 165 is connected with the body 110. The supply pipe 165a has a first end connected to the balloon 165 and a second end connected to a compressor 501 located outside the water tank, shown in FIG. 7, which will be explained later, to form a passage for supplying a gas to the balloon 165. The balloon 165 makes the cleaning robot 100 float on the surface of the water in the water tank when the cleaning robot 100 is difficult to move in the water or wrongly operates.

Here, the number and volume of balloons can be adjusted based on the weight of the cleaning robot 100. Furthermore, a neutral buoy 166 that maintains neutral buoyancy in the cleaning robot 100 when the cleaning robot 100 cannot float may be additionally provided to the body 110.

In addition, the supply pipe 165a may be placed with a power cable and a communication cable, which will be described later, in a single cable and connected to the cleaning robot 100. The supply pipe 165a may be come out of the cable in the body 110 and connected to the balloon 165.

The cleaning robot 100 may include a bumper part 170 provided in front of the body 110.

Figure 4:
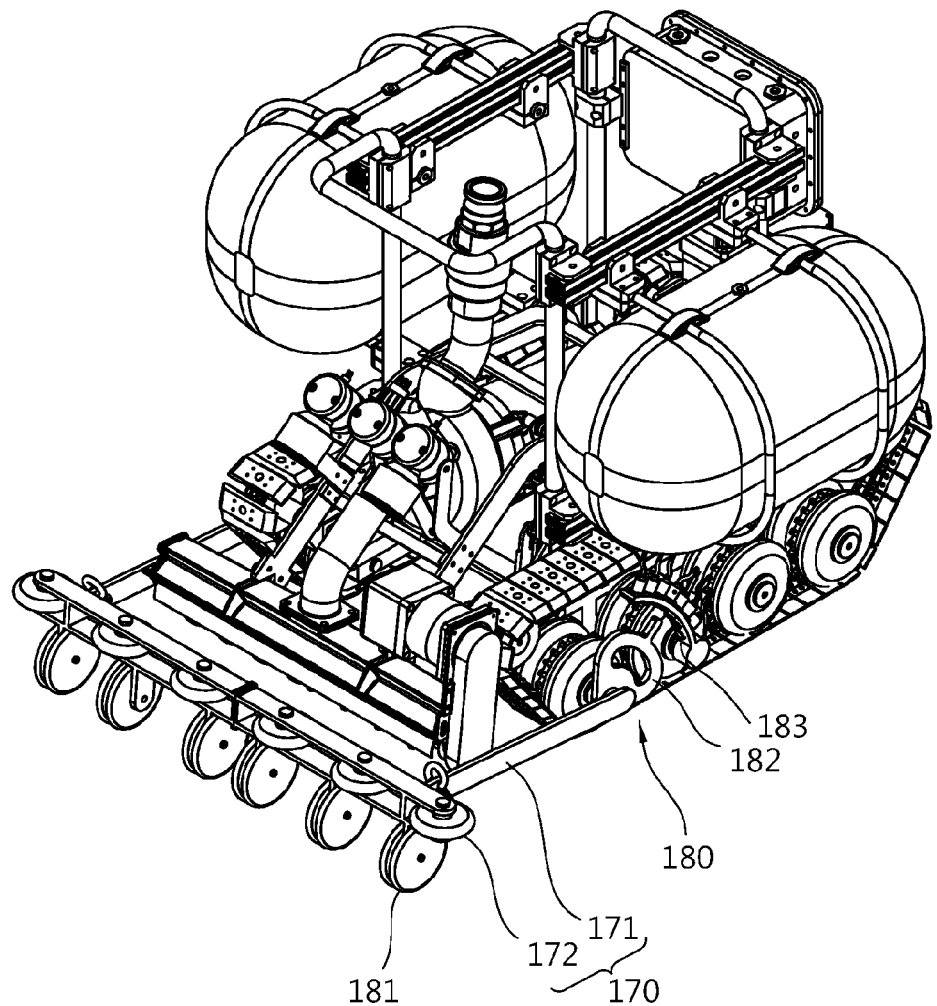
FIG. 4 is a perspective view of the cleaning robot with a bumper part according to an embodiment of the present invention.

FIG. 4 is a perspective view of the cleaning robot with the bumper part 170 according to an embodiment of the present invention.

Referring to FIG. 4, the bumper part 170 includes a supporting frame 171 and bumper wheels 172. The supporting frame 171 supports the bumper wheels 172 and a elevating wheel 181 which will be explained later. The supporting frame 171 rotates on an axis corresponding to a direction across the moving direction of the body 110.

The bumper wheels 172 are provided to be supported by the supporting frame 171 to roll in contact with obstructions appearing in front of the body 110. The bumper wheels 172 are arranged in a direction across the moving direction of the body 110. The bumper wheels 172 are provided such that the outermost bumper wheels are located outside the front corners of the body 110.

The bumper wheels 172 absorb shock generated when the cleaning robot 100 moving in the water tank collides with obstructions such as the inner walls of the water tank and a structure installed in the water tank and prevent the inner walls of the water tank, the structure in the water tank and the cleaning robot 100 from being damaged. To complement the shock-absorbing force of the bumper wheels 172, an elastic member such as a coil spring or rubber may be provided to shafts of the bumper wheels 172.

The cleaning robot 100 can detect the height of the sediment on the bottom of the water tank based on the rotation angle of the supporting frame 171 to estimate the quantity of the sediment. Specifically, the cleaning robot 100 can estimate that there is a small quantity of sediment when the rotation angle of the supporting frame 171 is narrow and estimate that there is a large quantity of sediment when the rotation angle of the supporting frame 171 is wide. Accordingly, the cleaning robot 100 may include a rotation angle sensing part 180 for sensing the rotation angle of the supporting frame 171.

Figure 5:
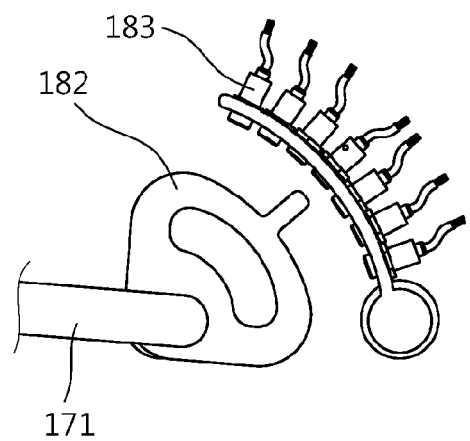
FIG. 5 is a side view roughly showing a rotation angle sensing part of the cleaning robot shown in FIG. 1.

FIG. 5 is a side view roughly showing the rotation angle sensing part of the cleaning robot 100.

Referring to FIG. 5, the rotation angle sensing part 180 includes an elevating wheel 181, a rotary loader 182 and a plurality of rotation angle sensors 183.

The elevating wheel 181 is supported by the supporting frame 171 to roll in contact with the bottom of the water tank. As described above, the supporting frame 171 is installed such that it can rotate on the axis corresponding to the direction across the moving direction of the body 110, and thus the elevating wheel 181 rolls on the bottom of the water tank and moves up and down according to the height of the sediment in the water tank. The rotary loader 182 is combined with the back end of the supporting frame 171 and rotates with the supporting frame 171. The rotation angle sensors 183 are arranged behind the rotary loader 182 and sense the rotation angle of the supporting frame 171.

The rotation angle sensing part 180 can estimate the quantity of the sediment in the water tank based on the height of the sediment by sensing the rotation angle of the supporting frame 171. The estimated quantity is used to control the tilting angle of the suction part 130 according to the tilting part 140, the power of the suction pump 161, the moving direction of the body 110 and whether the water tank cleaning operation continues.

Referring back to FIG. 1, the cleaning robot 100 includes a camera 168 and a light 167 installed in front of the body 110.

The camera 168 photographs the cleaning operation of the cleaning robot 100, the environment where the cleaning robot 100 operates, the overall operating state of the cleaning robot 100, etc. The camera 168 may be constructed in such a manner that a pan/tilt camera is set in a globular waterproof case.

The light 167 may use one of a high intensity discharge (HID) lamp, tungsten halogen lamp and a light emitting diode (LED).

The cleaning robot 100 is configured such that it can be aware of the location thereof.

Figure 6:
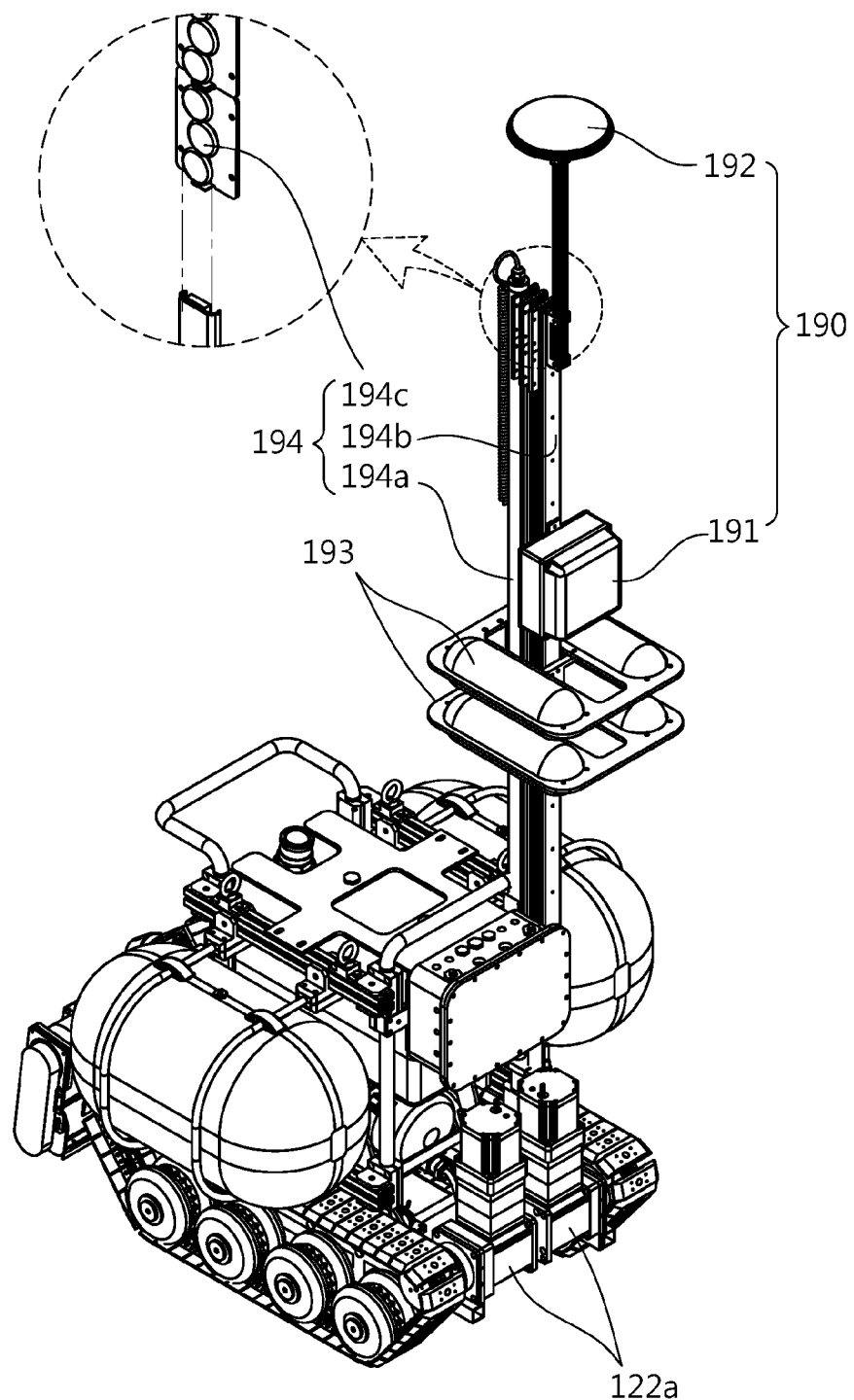
FIG. 6 is a perspective view of the cleaning robot including a location information sensing part and a retractable support according to an embodiment of the present invention.

FIG. 6 is a perspective view of the cleaning robot with a location information sensing part 190, a buoy 193 and a retractable support 194 according to an embodiment of the present invention.

Referring to FIG. 6, the cleaning robot 100 includes the location information sensing part 190, the buoy 193 and the retractable support 194.

The location information sensing part 190 senses the location of the body 110 in the water tank and includes a global positioning system (GPS) sensor 191 and a GPS antenna 192. The GPS sensor 191 is supported by the retractable support 194 and the GPS antenna 192 is pulled out of the GPS sensor 191 and set up on the GPS sensor 191. Here, the GPS sensor 191 can use a deep GPS (DGPS) sensor having an error range of several dozen meters although it can use a general GPS sensor having an error range of several meters.

The buoy 193 is located under the GPS sensor 191 and combined with the retractable support 194. The buoy 193 makes the GPS sensor 191 float on the surface of the water in the water tank all the time.

The retractable support 194 includes a combining rod 194a, elevating rods 194b and rollers 194c. The combining rod 194a is combined with the body 110. The elevating rods 194b are connected with the combining rod 194a and combined with the buoy 193 and the GPS sensor 191 to be elevated from the combining rod 194a according to the level of the water in the water tank. The number of the elevating rods 194b may be increased or decreased. The rollers 194c are provided between the combining rod 194a and the elevating rods 194b and between the elevating rods 194b and roll to support the elevating rods 194b.

Furthermore, the cleaning robot 100 can estimate its moving range based on the number of revolutions, transmitted from an encoder mounted on a wheel motor 122a (refer to FIG. 6) for driving the wheels 122.

An underwater sediment cleaning apparatus using the aforementioned cleaning robot according to embodiments of the present invention will now be explained with reference to the attached drawings.

Figure 7:
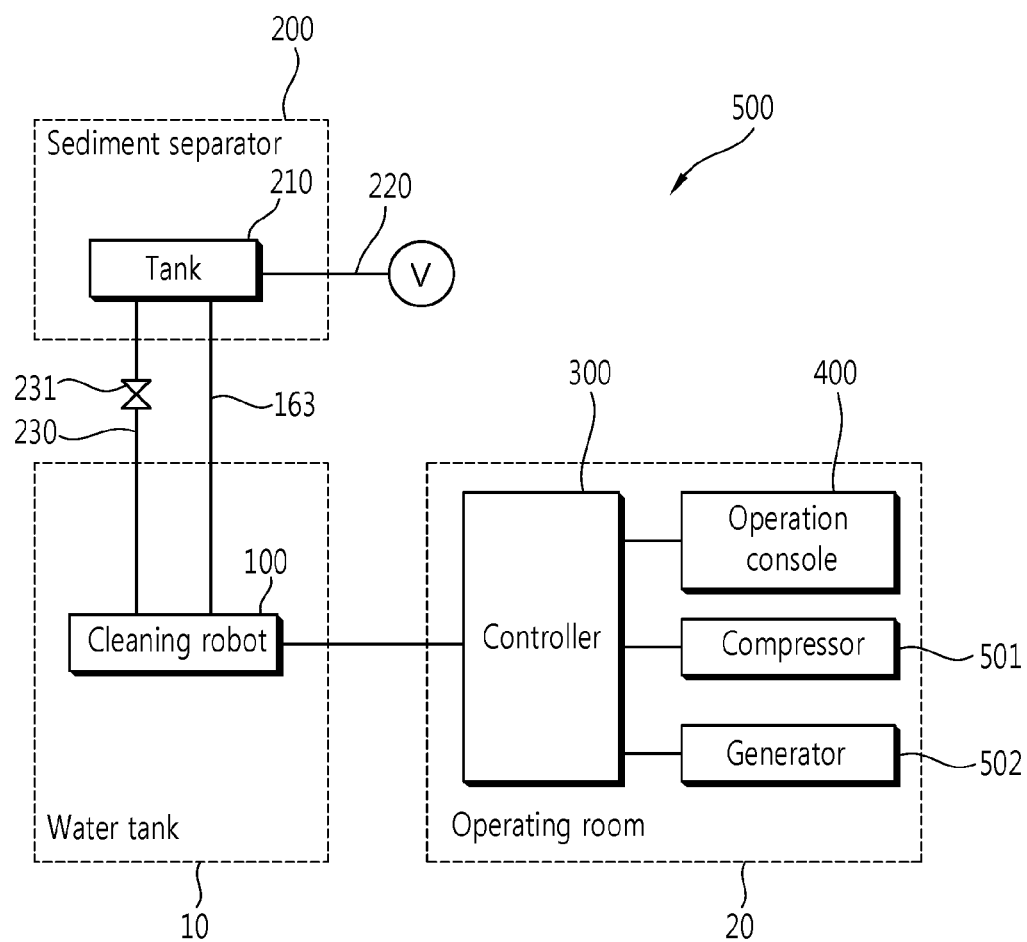
FIG. 7 is a block diagram of an underwater sediment cleaning apparatus according to an embodiment of the present invention.
Figure 8:
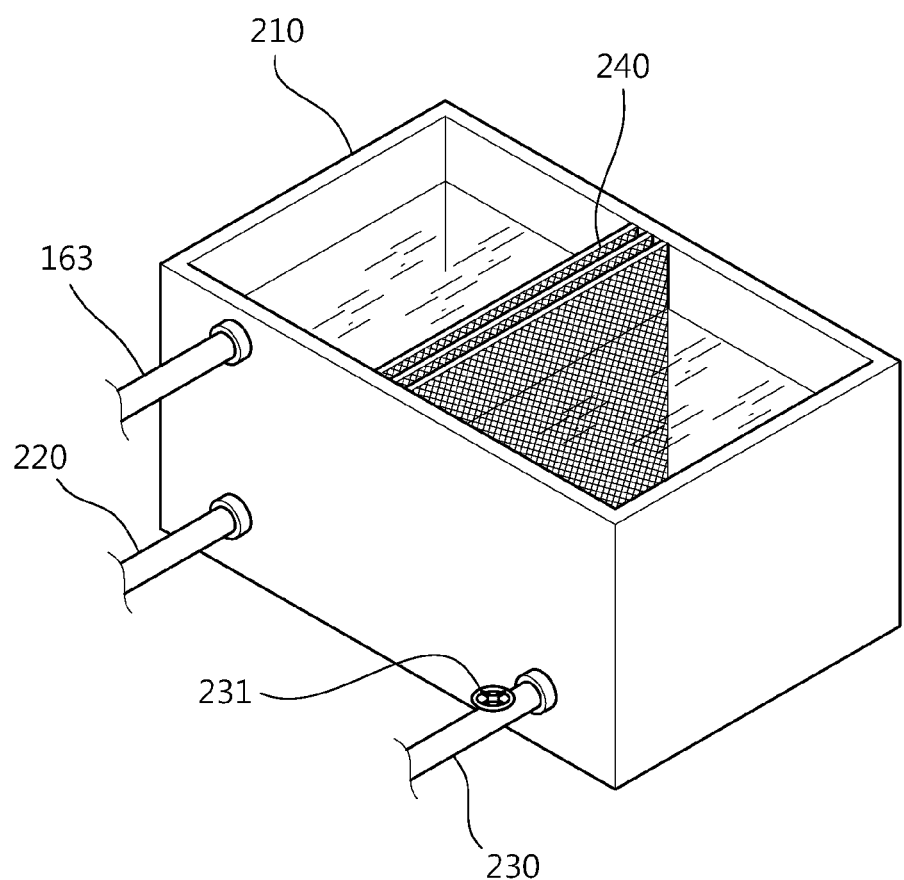
FIG. 8 is a perspective view of a sediment separator of the underwater sediment cleaning apparatus shown in FIG. 7.

FIG. 7 is a block diagram of the underwater sediment cleaning apparatus 500 according to the present embodiment and FIG. 8 is a perspective view of a sediment separator 200 of the underwater sediment cleaning apparatus 500 shown in FIG. 7.

Referring to FIGS. 7 and 8, the underwater sediment cleaning apparatus 500 includes the cleaning robot 100, the sediment separator 200, a controller 300 and an operation console 400.

The contaminated water discharge pipe 163 connected to the cleaning robot 100 is extended to the sediment separator 200.

The sediment separator 200 separates sediment from the contaminated water sucked from the cleaning robot 100 and includes a tank 210, a sediment discharge pipe 220, an intake pipe 230 and a filter 240. The tank 210 is located outside the water tank and the contaminated discharge pipe 163 is connected to an upper portion of one side of the tank 210. The sediment discharge pipe 220 is connected to a lower portion of one side of the tank 210. The sediment discharge pipe 220 is connected to a vacuum car located outside the tank 210 to form a route for discharging sediment filtered by the filter 240 and left in the tank 210. The intake pipe 230 is connected to the other side of the tank 210 and extended to the water tank 10. The intake pipe 230 has a valve 231 which controls the flow rate of clean water obtained by filtering the sediment of the contaminated water using the filter 240.

The filter 240 is provided between one side and the other side of the tank 210 and filters the sediment from contaminated water.

An operating room 20 is arranged outside the water tank 10. The operating room 20 may use a container box such to be movable. The controller 300 for controlling the cleaning robot 100 is installed in the operating room 20. The operating room 20 may have the controller 300, a generator 502 for providing power to the cleaning robot 100 and a compressor 501, which are installed therein.

Figure 9:
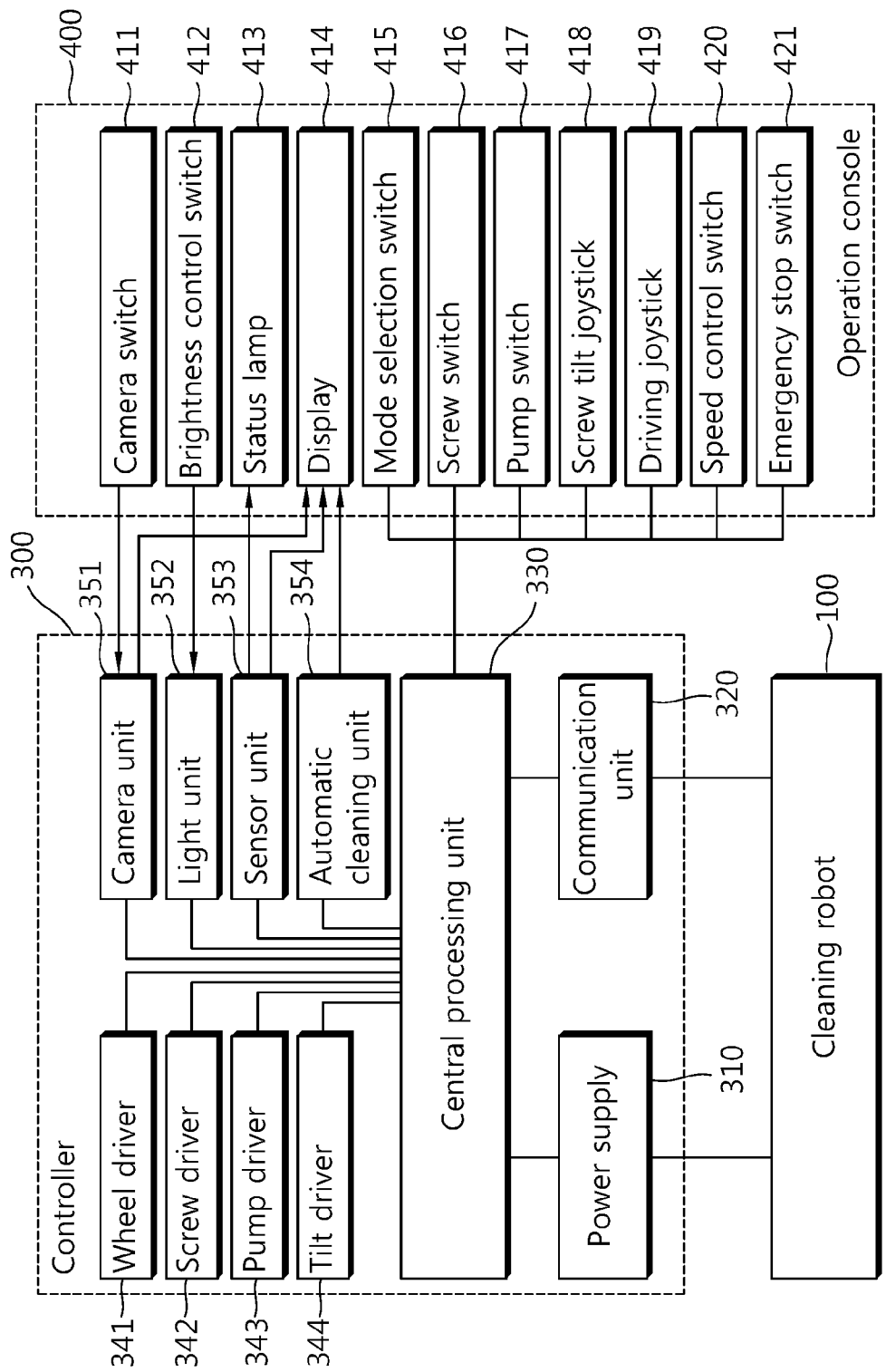
FIG. 9 is a block diagram showing connections among the cleaning robot, a controller and an operation console of the cleaning apparatus according to an embodiment of the present invention.

FIG. 9 is a block diagram showing connections of the cleaning robot 100, the controller 300 and the operation console 400 of the underwater sediment cleaning apparatus according to the present embodiment.

Referring to FIG. 9, the controller 300 includes a power supply 310, a communication unit 320 and a central processing unit 330. The power supply 310 and the communication unit 320 are connected to the cleaning robot 100 and the central processing unit 330 through the power cable and the communication cable. The power supply 310 can supply power generated from the generator 502 shown in FIG. 7. Otherwise, the power supply 310 may use power provided by an external power supply source.

Furthermore, the controller 300 includes a wheel driver 341, a screw driver 342, a pump driver 343, and a tilt driver 344. The wheel driver 341 is connected to the driver 120 of the cleaning robot 100 through the central processing unit 330 and controls the operation of the cleaning robot 100. The screw driver 342 is connected to the motor 133 of the cleaning robot 100 through the central processing unit 330 and controls the rotation speed and rotation direction of the screw 132. The tilt driver 344 is connected to the tilt cylinder 144 of the cleaning robot 100 through the central processing unit 330 and controls the tilting angle of the suction part 130. The pump driver 343 is connected to the suction pump 161 of the cleaning robot 100 through the central processing unit 330 and controls the operation of the suction pump 161 through the central processing unit 330.

In addition, the controller 300 includes a camera unit 351, a lighting unit 352, a sensor unit 353 and an automatic cleaning unit 354. The camera unit 351 is connected to the camera 168 of the cleaning robot 100 through the central processing unit 330, processes images captured by the camera 168 and displays the processed images. The lighting unit 352 is connected to the light 167 of the cleaning robot 100 through the central processing unit 330 and controls the brightness of the light 167. The sensor unit 353 is connected to the tilt limit sensing part 150 and the rotation angle sensing part 180 of the cleaning robot 100 through the central processing unit 330 and processes sensing signals generated from sensors included in the tilt limit sensing part 150 and the rotation angle sensing part 190.

The automatic cleaning unit 354 is connected to the cleaning robot 100 through the central processing unit 330 analyzes the location of the cleaning robot 100 and controls the cleaning robot 100 to move along a predetermined route. The automatic cleaning unit 354 may use an industrial computer. The automatic cleaning unit 354 has a touch screen which displays the location of the cleaning robot 100 and a cleaning area.

As described above, the central processing unit 330 is connected to the drivers 341,342,343 and 344 and the units 351, 352, 353 and 354 and linked to the cleaning robot 100 through the power supply 310 and the communication unit 320. The central processing unit 330 controls the power supplied to the cleaning robot 100 and processes data transmitted between the cleaning robot 100 and other components of the cleaning apparatus. Furthermore, the central processing unit 330 processes control commands of the drivers 341, 342, 343 and 344 and the units 351, 352, 353 and 354.

Figure 10:
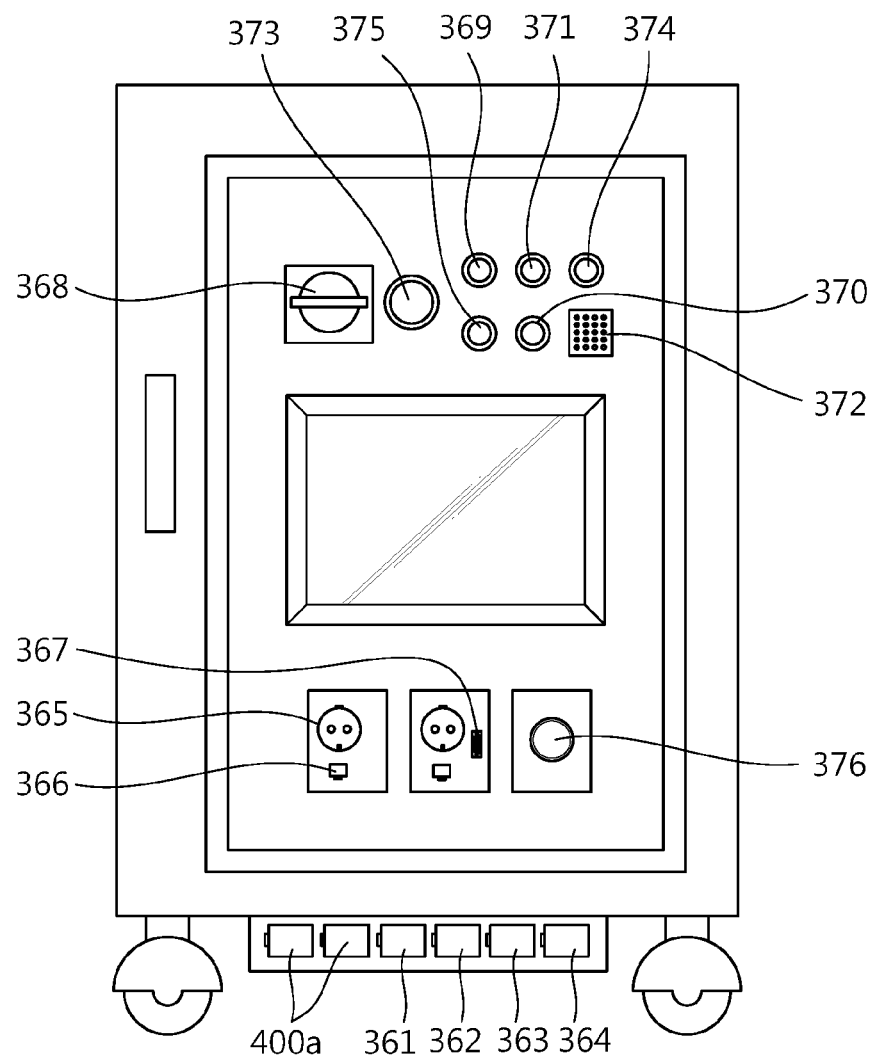
FIG. 10 is a front view showing the exterior of the controller of the underwater sediment cleaning apparatus according to an embodiment of the present invention.

FIG. 10 is a front view of the exterior of the controller of the underwater sediment cleaning apparatus according to the present embodiment.

Referring to FIG. 10, the controller 300 includes an input connector 361, an output connector 362, a control connector 363 and a pneumatic connector 364. The input connector 361 is connected to an input cable extended to be provided with power supplied from the generator 502 or the external power supply source. The output connector 362 is connected to an output cable coupled to the cleaning robot 100. The control connector 363 is connected to the cleaning robot 100 to be coupled to a communication cable through which data is transmitted/received between the cleaning robot 100 and other components of the cleaning apparatus. The pneumatic connector 364 is connected to the balloon 165 and the supply pipe 165a supplying a gas to the balloon 165.

Moreover, the controller 300 includes an operation console connector 400a, a plurality of output plugs 365, a LAN port 366, and an image output port 367. The operation console connector 400a connects the operation console 400 and the controller 300. The operation console connector 400a allows the power supplied to the controller 300 to be provided to the operation console 400 and permits the controller 300 and the operation console 400 to transmit/receive data to/from each other. There may be a plurality of operation console connectors 400a to connect a plurality of operation consoles to the controller 300.

The output plugs 365 provide power to a terminal, a portable device, etc. other than the operation console 400 using the power supplied to the controller 300. The LAN port 365 allows the terminal, portable device, etc. and the controller 300 to exchange data. The image output port 367 transmits an image signal corresponding to an image photographed by the camera 168 to the operation console 400 such that a display 414 provided to the operation console 400 displays the image.

In addition, the controller 300 includes an input power switch 368, an input power state lamp 369, an output power state lamp 370, an operation stand-by state lamp 371, a warning buzzer 372, a first emergency stop switch 373, a reset button 374, an automatic cleaning unit power switch 375, and a first brightness control switch 376.

The input power switch 368 allows input power applied to a power connector to be supplied to the controller 300 and the cleaning robot 100. The input power state lamp 369 indicates whether or not the input power supplied to the controller 300 is normal. If the cleaning apparatus performs an underwater cleaning work outdoors, the input power may have input current lower than the current used by the controller 300. On the contrary, the input power may have input current higher than the current used by the controller 300. That is, when the input power becomes abnormal, the input power state lamp 369 blinks to warn that the input power is abnormal. The output power state lamp 370 indicates whether or not the power supplied to the cleaning robot 100 is normal. The power cable connected to the cleaning robot 100 may be down due to its abnormal state or excessive current cause by electric leakage or overload may flows. When the output power becomes abnormal, as described, the output power state lamp 370 blinks to warn that the output power state is abnormal. The operation stand-by state lamp 371 indicates that power is supplied to the controller 300 and all of components are ready to operate so that the cleaning robot 100 can be operated. The warning buzzer 372 generates alarm sound when a wrong operation occurs during operator's absence to inform the operator to know the wrong operation. The first emergency stop switch 373 is used to stop the operation of the controller 300 and make the controller 300 to cut power. The reset button 374 is used to reset the cleaning apparatus when the cleaning apparatus cannot normally operate due to overload applied to the controller 300 or the cleaning robot 100 or other unknown causes. The reset button 374 blinks a warning light when the cleaning apparatus cannot normally operate. The automatic cleaning unit power switch 375 is used to select an automatic cleaning mode or a manual cleaning mode. The user can select the manual cleaning mode by turning the automatic cleaning unit power switch 375 to 'manual cleaning mode' and select the automatic cleaning mode by turning the automatic cleaning unit power switch 375 to 'automatic cleaning mode'. When the automatic cleaning mode is selected, the automatic cleaning unit 354 starts to operate (for example, activate GPS unit and activates related software).

The first brightness control switch 376 is configured in the form of a rotary switch and controls the brightness of the light 167 included in the cleaning robot 100.

Referring back to FIG. 7, the operation console 400 is connected to the controller 300 and used for the operator to manually operate the cleaning robot 100. The operation console 400 may be provided in the form of a bag such that the operator can easily carry the operation console 400.

Figure 11:
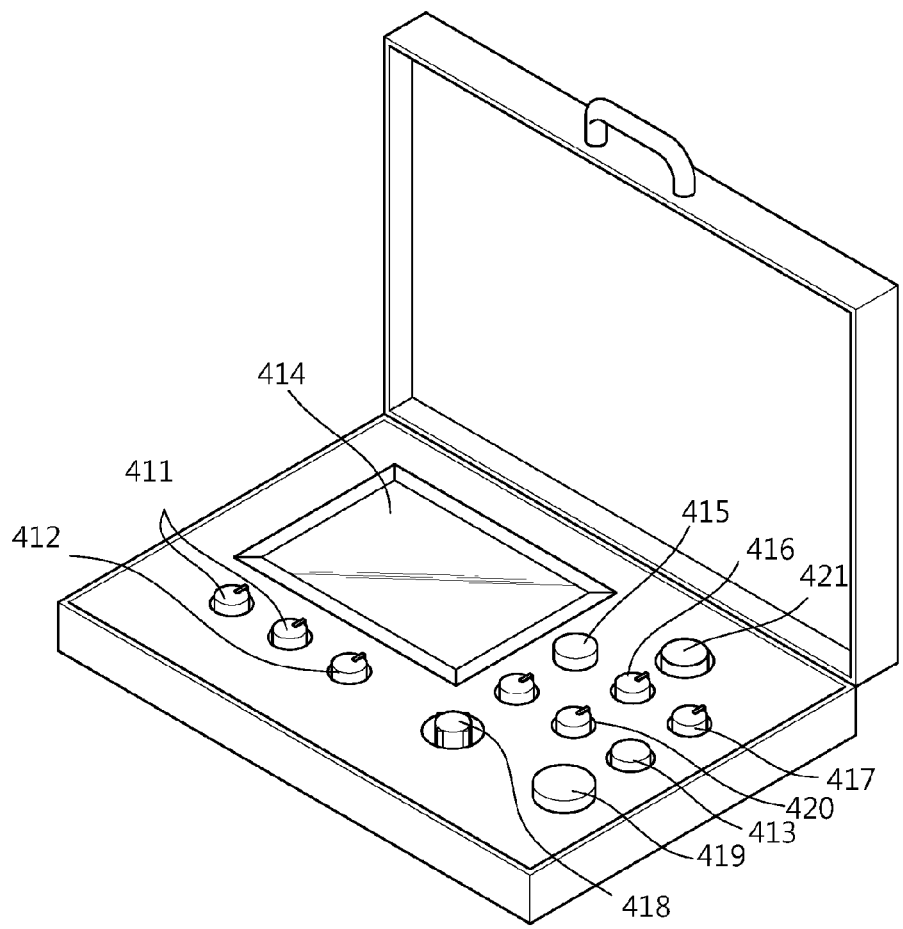
FIG. 11 illustrates the exterior of the operation console of the underwater sediment cleaning apparatus according to an embodiment of the present invention.

FIG. 11 illustrates the exterior of the operation console of the underwater sediment cleaning apparatus according to the present embodiment.

Referring to FIGS. 9 and 11, the operation console 400 includes a camera switch 411, a second brightness control switch 412, a status lamp 413 and the display 414. The camera switch 411 is connected to the camera unit 351. The camera switch 411 is used to turn on/off the camera 168 included in the cleaning robot 100. The second brightness control switch 412 is connected to the lighting unit 352 and controls the brightness of underwater light. The status lamp 413 is connected to the sensor unit 353 and indicates statuses of the sensors included in the tilt limit sensing part 150 and the rotation angle sensing part 180 of the cleaning robot 100. The display 414 is connected to the camera unit 351, the sensor unit 353 and the automatic cleaning unit 354 and displays an image photographed by the camera 168, signals sensed by the sensors include in the tilt limit sensing part 150 and the rotation angle sensing part 180, the route of the cleaning robot 100, and the current location of the cleaning robot 100.

In addition, the operation console 400 includes a mode selection switch 415, a screw switch 416, a pump switch 417, a driving joystick 419, a screw tilt joystick 418, a speed control switch 420, and a second emergency stop switch 421 The mode selection switch 415, the screw switch 416, the pump switch 417, the driving joystick 419, the screw tilt joystick 418, the speed control switch 420 and the second emergency stop switch 421 are connected to the central processing unit 330.

The mode selection switch 415 is used to select one of the manual cleaning mode and the automatic cleaning mode of the cleaning robot 100. The screw switch 416 is used to control the rotation direction and rotation speed of the screw 132. The pump switch 417 used to turn on/off the suction pump 161. The driving joystick 419 is used to steer the cleaning robot 100. The speed control switch 420 is used to control the moving speed of the cleaning robot 100. The second emergency stop switch 421 is used to stop the operation of the cleaning robot 100 when the cleaning robot 100 performs a wrong operation.

An underwater sediment cleaning method according to an embodiment of the present invention will now be explained.

Figure 12:
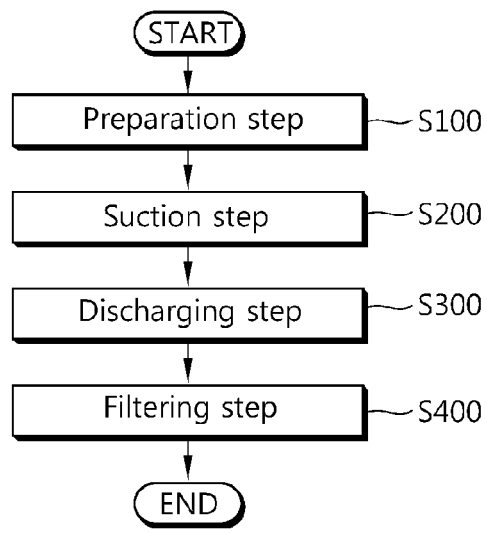
FIG. 12 is a flowchart showing an underwater sediment cleaning method.

FIG. 12 is a flowchart showing the underwater sediment cleaning method according to an embodiment of the present invention.

Referring to FIG. 12, the underwater sediment cleaning method includes a preparation step S100, a suction step S200, a discharging step S300 and a filtering step S400.

The cleaning robot 100 is put into the water tank to prepare an underwater cleaning operation in the preparation step S100. The cleaning robot 100 sucks contaminated water containing sediment while moving in the water tank in the suction step S200. The contaminated water sucked by the cleaning robot 100 is discharged to the outside of the water tank in the discharging step S300. The sediment in the contaminated water is filtered and clean water flows into the water tank in the filtering step S400.

Figure 13A:
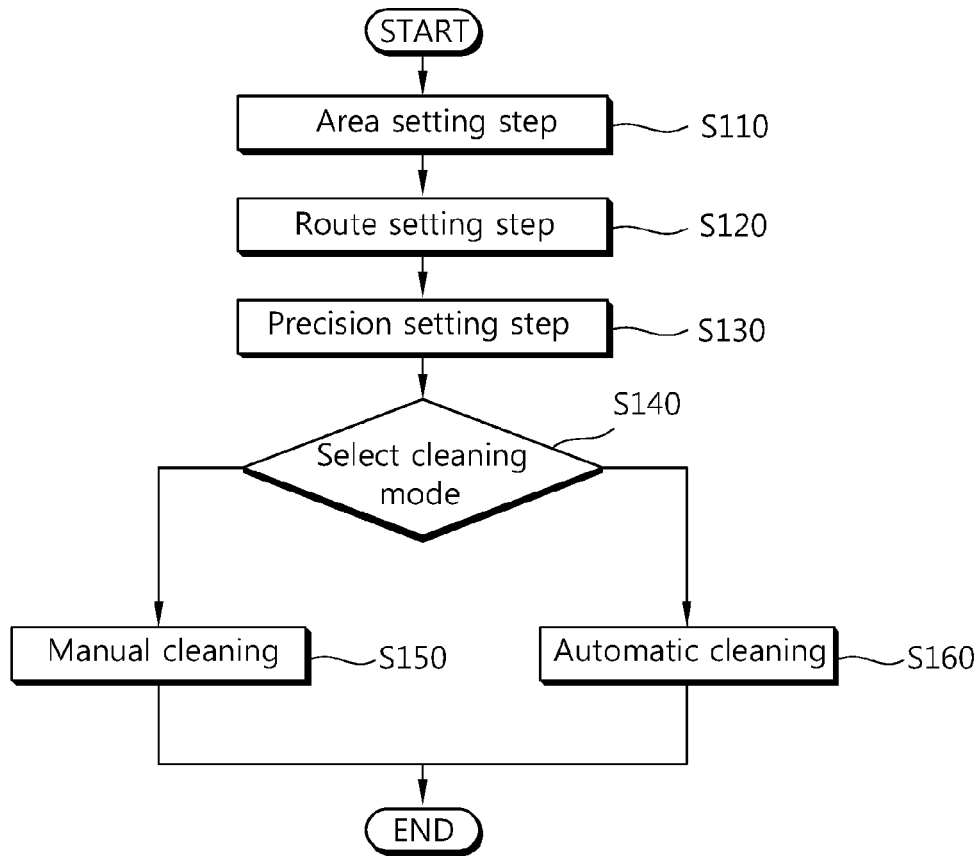
FIG. 13a is a flowchart showing a preparation step in the underwater sediment cleaning method shown in FIG. 12.
Figure 13B:
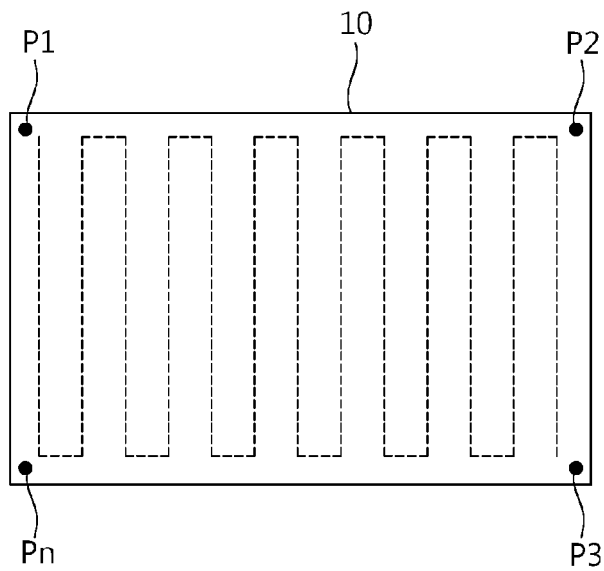
FIGS. 13b, 13c, 13d and 13e are plan views showing coordinates, routes and the space between neighboring route parts, which are set based on the shape of the bottom of a water tank in the underwater sediment cleaning method shown in FIG. 12.
Figure 13C:
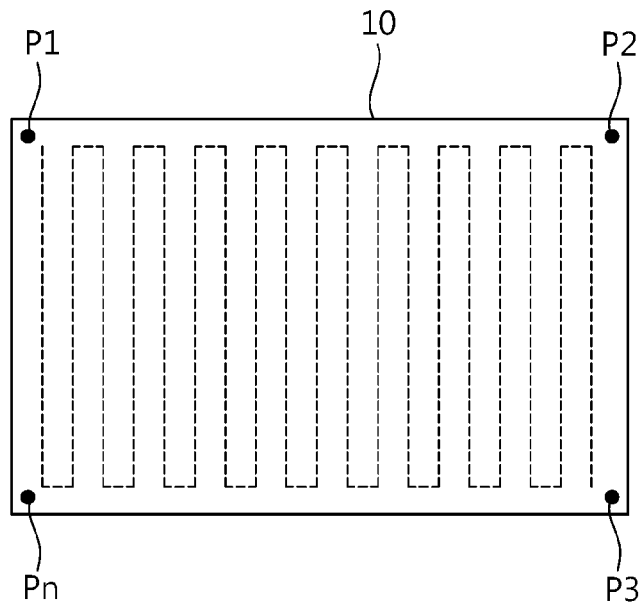
Figure 13D:
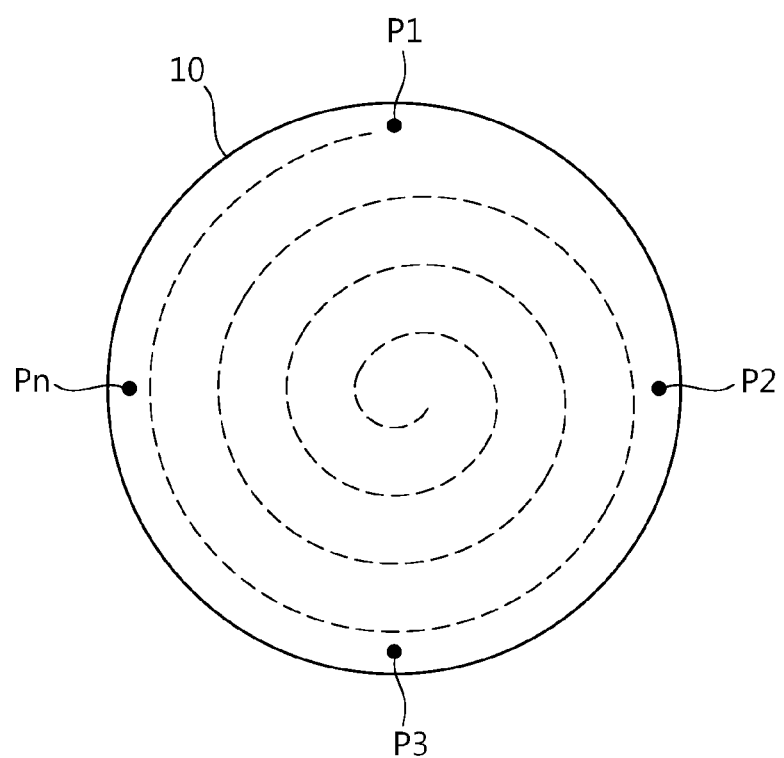
Figure 13E:
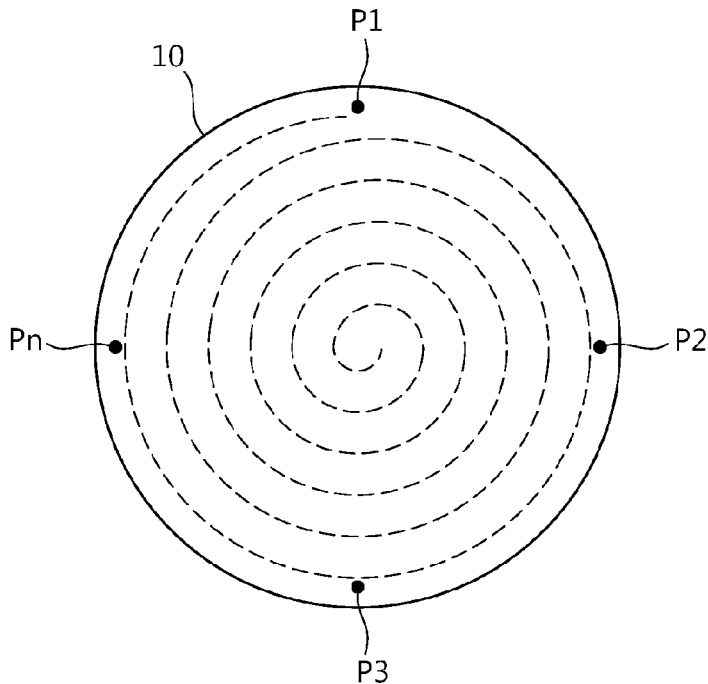

FIG. 13a is a flowchart showing the preparation step S100 in the underwater sediment cleaning method shown in FIG. 1 and FIGS. 13b, 13c, 13d and 13e are plan views showing coordinates, routes and the space between neighboring route parts which are set based on the shape of the bottom of the water tank and used for the underwater sediment cleaning method shown in FIG. 12.

Referring to FIGS. 13a though 13e, the preparation step S100 includes an area setting step S110, a route setting step S120, a precision setting step S130 and a mode selection step S140.

An area which will be cleaned by the cleaning robot 100 is set in the area setting step S110. In the area setting step S110, coordinates P1, P2, P3, . . . , Pn based on the shape of the bottom of the water tank 10 are set. If the bottom of the water tank 10 has a polygonal shape, for example, coordinates P1, P2, P3, . . . , Pn corresponding to corners of the bottom of the water tank 10 can be set. If the bottom of the water tank 10 has a circular shape, coordinates P1, P2, P3, . . . , Pn corresponding to the edge of the bottom of the water tank 10 can be set.

The moving route of the cleaning robot 100 is set in the route setting step S120. In this step, the route of the cleaning robot 100 may be set based on the shape of the bottom of the water tank 10. If the bottom of the water tank 10 has a polygonal shape, for example, a zigzag route can be set. If the bottom of the water tank 10 has a circular shape, a spiral route can be set.

The space between neighboring route parts is controlled in the precision setting step S130. A degree of precision of cleaning increases as the space between neighboring route parts becomes closer to each other and decreases as the space between neighboring route parts becomes apart from each other. The space between neighboring route parts is set to a narrow level when the cleaning robot 100 cleans a severely contaminated water tank or intensively cleans part of the route, which is severely contaminated. The space between neighboring route parts is set to a wide level when the cleaning robot 100 cleans a water tank that is not seriously contaminated or performs rough cleaning before thorough cleaning.

One of the manual cleaning mode and the automatic cleaning mode can be selected according to a degree of contamination of the water stored in the water tank 10 in the mode setting step S140. Specifically, the manual cleaning mode can be selected (S140) when the internal state of the water tank 10 can be recognized with the camera 168 attached to the cleaning robot 100 due to a low degree of contamination. On the contrary, the automatic cleaning mode can be selected (S150) when the internal state of the water tank 10 is difficult to recognize with the camera 168 attached to the cleaning robot 100 due to a high degree of contamination.

In the preparation step S100, it is possible to display the number of times cleaning is repeated, the area which has been cleaned by the cleaning robot 100 and the area which is not cleaned.

An underwater sediment cleaning method according to the automatic cleaning mode will now be explained.

Figure 14:
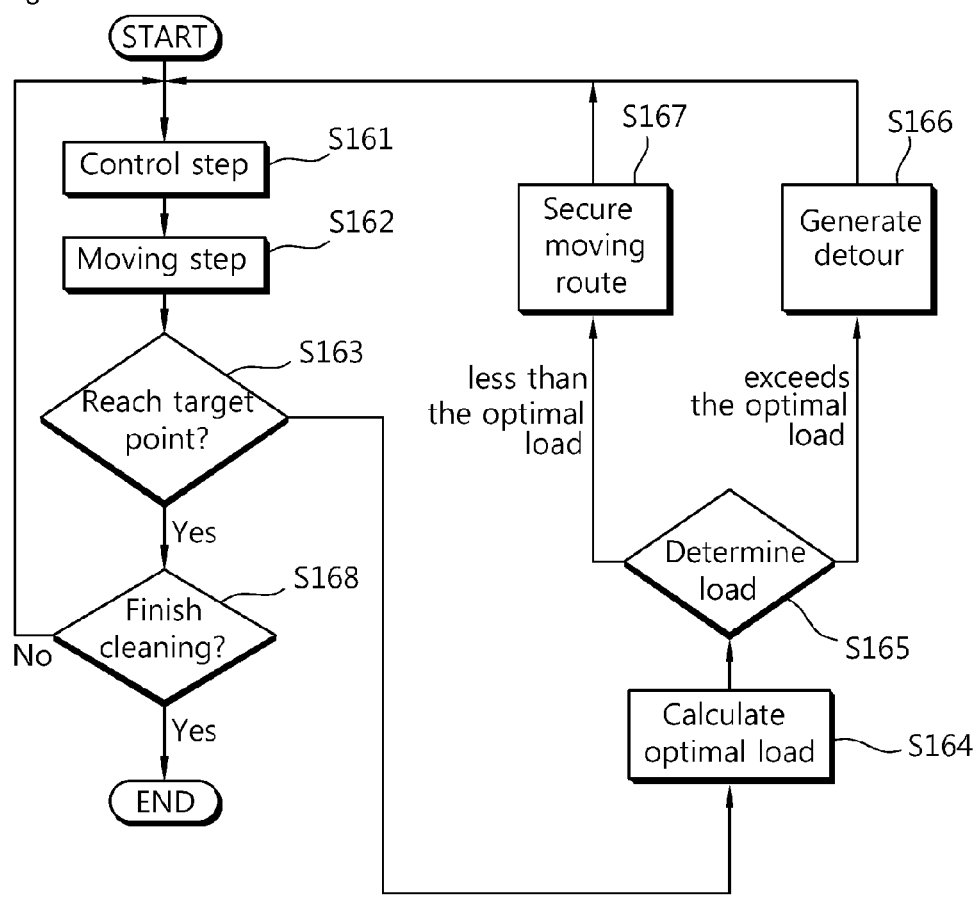
FIG. 14 is a flowchart showing a cleaning method according to an automatic cleaning mode according to an embodiment of the present invention.

FIG. 14 is a flowchart showing the underwater sediment cleaning method according to the automatic cleaning mode according to an embodiment of the present invention.

Referring to FIG. 14, the underwater sediment cleaning method according to the automatic cleaning mode includes a control step S161, a moving step S162, a target point arrival determination step S163 and a cleaning completion determination step S168.

Location information is received from the cleaning robot 100 and the location of the cleaning robot 100 is controlled based on the received location information in the control step S161.

Figure 15:
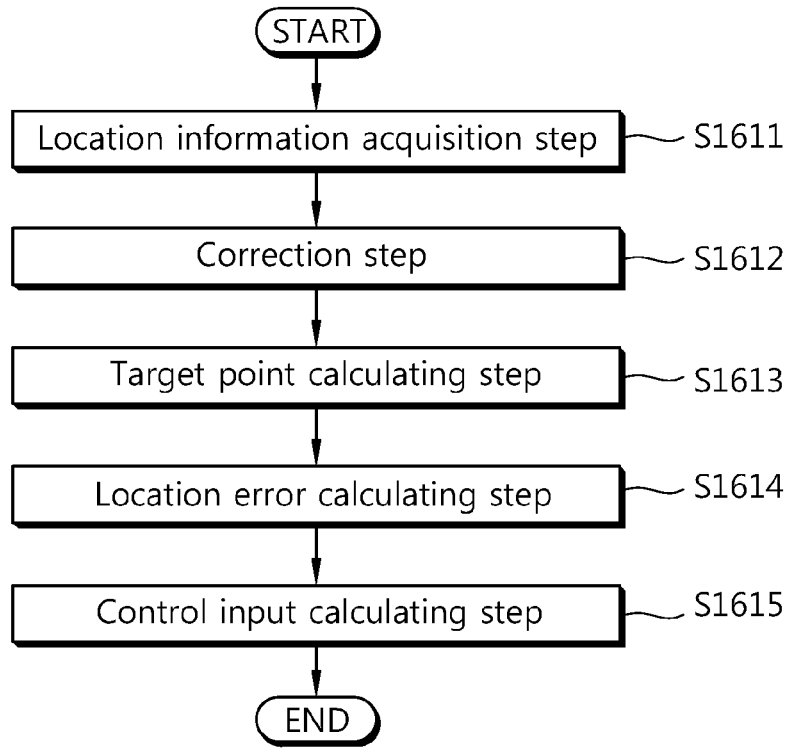
FIG. 15 is a flowchart showing a control step in the cleaning method according to the automatic cleaning mode, shown in FIG. 14.

FIG. 15 is a flowchart showing the control step in the underwater sediment cleaning method according to the automatic cleaning mode, shown in FIG. 14.

Referring to FIG. 15, the control step S161 includes a location information acquisition step S1611, a correction step S1612, a target point calculating step S1613, a location error calculating step S1614, and a control input calculating step S1615.

The automatic cleaning unit 354 can acquire first location information and second location information from the cleaning robot 100. The first location information is sensed by the GPS sensor 191 included in the cleaning robot 100 and the second location information is estimated based on the number of revolutions of the wheels 122, transmitted from the encoder set in the wheel motor 122a of the cleaning robot 100.

The first location information and the second location information are acquired in the location information acquisition step S1611. The current location of the cleaning robot 100 is precisely calculated using extended Kalman filter based on the first location information and the second location information in the correction step S1612. In the target point calculating step S1613, a target point on the route generated in the preparation step S100, which has to be tracked in the current location, is calculated and found based on the current location of the cleaning robot 100, calculated in the correction step S1612. A difference between the target point and the current location is calculated in the location error calculating step S1614. In the control input calculating step S1615, speed values of the left and right wheels 122 of the cleaning robot 100 are calculated based on the difference between the target point and the current location, calculated in the location error calculating step S1614.

Referring back to FIG. 14, in the moving step S162, the cleaning robot 100 moves toward the target point according to a rotation speed of the encoder of the wheel motor 122a based on the speed values of the left and right wheels 122, calculated in the control input calculating step S1615.

It is determined whether the cleaning robot 100 arrives at the target point in the target point arrival determination step S163. Here, the cleaning robot 100 moving toward the target point may not reach the target point. Specifically, the cleaning robot 100 cannot move due to an obstruction on the moving route or the moving speed of the cleaning robot 100 is reduced since there are large amount of works on the moving route.

When the cleaning robot 100 cannot arrive at the target point, a predetermined optimal load of the cleaning robot 100 is compared with the current load of the cleaning robot 100 (S165) to detect the load of the cleaning robot 100 (S165). The load of the cleaning robot 100 can be calculated based on the current consumed by the cleaning robot 100 and the rotation speed of the wheels.

When the cleaning robot 100 cannot reach the target point since the load of the cleaning robot 100 exceeds the optimal load, it can be determined that an obstruction appears on the moving route of the cleaning robot 100.

Figure 16:
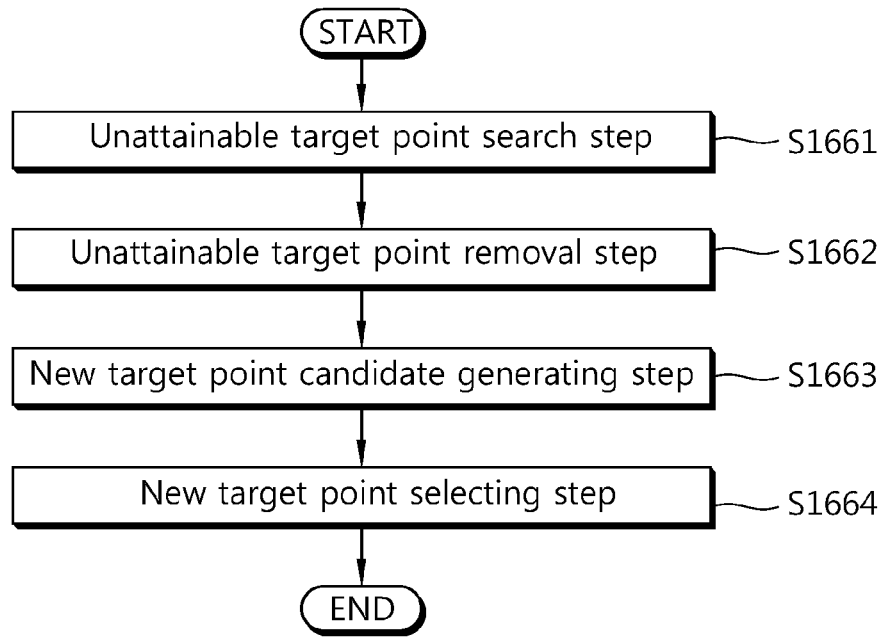
FIG. 16 is a flowchart showing an operation of generating a detour of the cleaning robot in the cleaning method according to the automatic cleaning mode, shown in FIG. 14.
Figure 17:
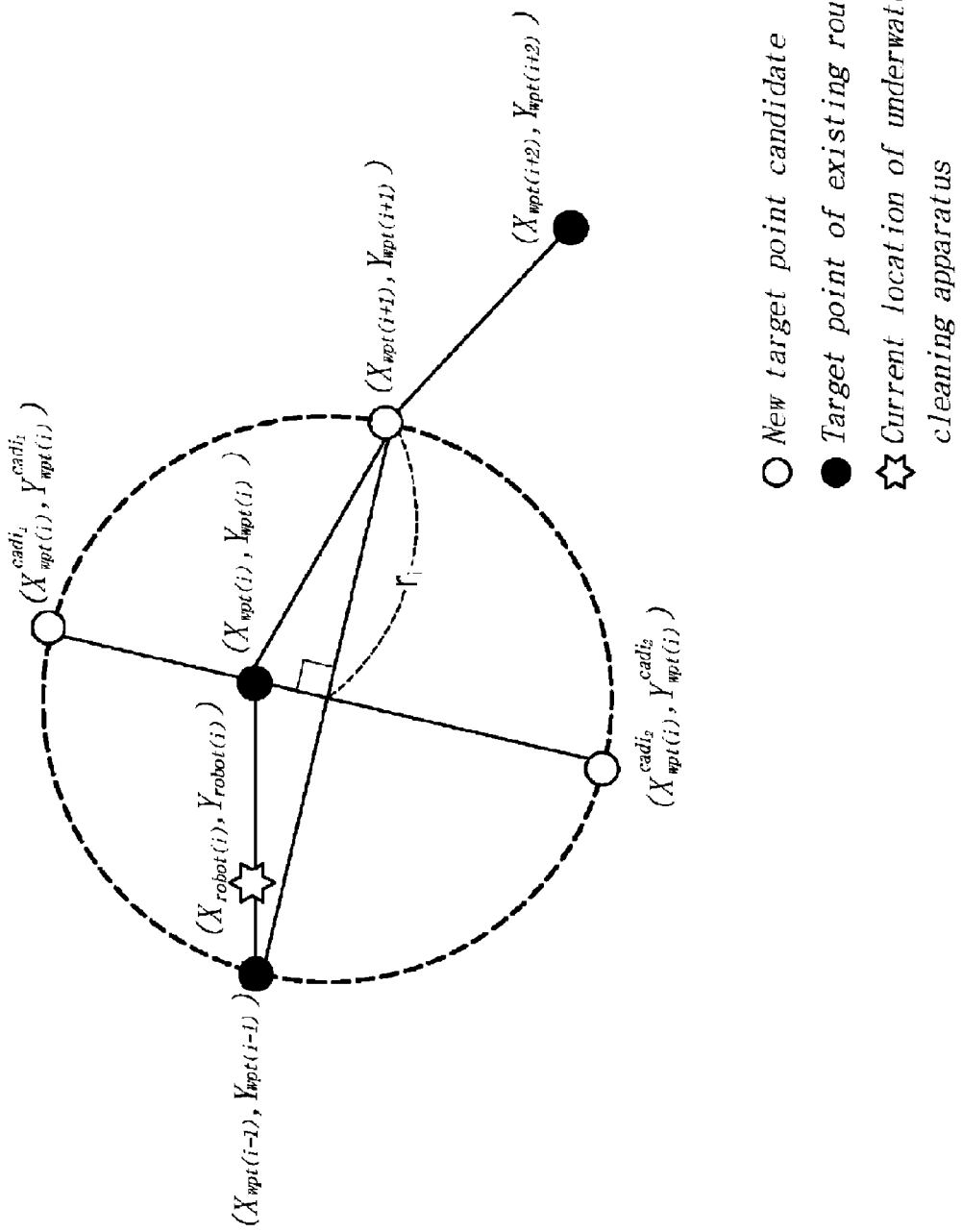
FIG. 17 is a view for explaining an algorithm of generating the detour of the cleaning robot in the cleaning method according to the automatic cleaning mode, shown in FIG. 14.

FIG. 16 is a flowchart showing an operation of generating a detour of the cleaning robot 100 in the underwater sediment cleaning method according to the automatic cleaning mode, shown in FIG. 14, and FIG. 17 is a view for explaining an algorithm of generating the detour of the cleaning robot 100 in the underwater sediment cleaning method according to the automatic cleaning mode, shown in FIG. 14.

Referring to FIGS. 16 and 17, when the load of the cleaning robot 100 exceeds the optimal load, the detour of the cleaning robot 100 is generated (S166). The operation of generating the detour includes an unattainable target point search step S1661, an unattainable target point removal step S1662, a new target point candidate generating step S1663, and a new target point selecting step S1664.

Specifically, the cleaning robot 100 cannot move toward the target point $(X_{wpt(i)}, Y_{wpt(i)})$ in the current location $(X_{robot(i)}, Y_{robot(i)})$. Accordingly, it is required to generate a new target point of the cleaning robot 100.

New target point candidates are generated based on the target point $(X_{wpt(i-1)}, Y_{wpt(i-1)})$ through which the cleaning robot 100 passed on the basis of the current location $(X_{robot(i)}, Y_{robot\ (i)})$ of the cleaning robot 100 and a target point $(X_{wpt(i+1)}, Y_{wpt(i+1)})$ after the initial target point $(X_{wpt(i)}, Y_{wpt(i)})$.

Here, a circle having a diameter $r_1$ corresponding to the straight line that connects the two target points $(X_{wpt(i-1)}, Y_{wpt(i-1)})$ and $(X_{wpt(i+1)}, Y_{wpt(i+1)})$ can be obtained. A normal which intersects the line that passes the center point of the circle and connects the two target points $(X_{wpt(i-1)}, Y_{wpt(i-1)})$ and $(X_{wpt(i+1)}, Y_{wpt(i+1)})$ is generated and two intersection points of the circle and the normal are generated as new target point candidates $(X_{wpt(i)}^{cadi1}, Y_{wpt(i)}^{cadi1})$ and $(X_{wpt(i)}^{cadi2}, Y_{wpt(i)}^{cadi2})$.

In consideration of whether the cleaning robot 100 collides with the working environment and distances between the two target point candidates $(X_{wpt(i)}^{cadi1}, Y_{wpt(i)}^{cadi1})$ and ($X_{wpt(i)}^{cadi2}$, $Y_{wpt(i)}^{cadi2}$) and the following target point ($X_{wpt(i+2)}$, $Y_{wpt(i+2)}$), the final target point is selected from the two new target point candidates ($X_{wpt(i)}^{cadi1}$, $Y_{wpt(i)}^{cadi1}$) and ($X_{wpt(i)}^{cadi2}$, $Y_{wpt(i)}^{cadi2}$). The final target point becomes a new target point and a route to the new target point becomes a detour around the initial target point at which the cleaning robot 100 cannot arrive.

When the cleaning robot 100 cannot reach the target point even though the load of the cleaning robot 100 is less than the optimal load, it can be determined that there is a large amount of works.

Figure 18:
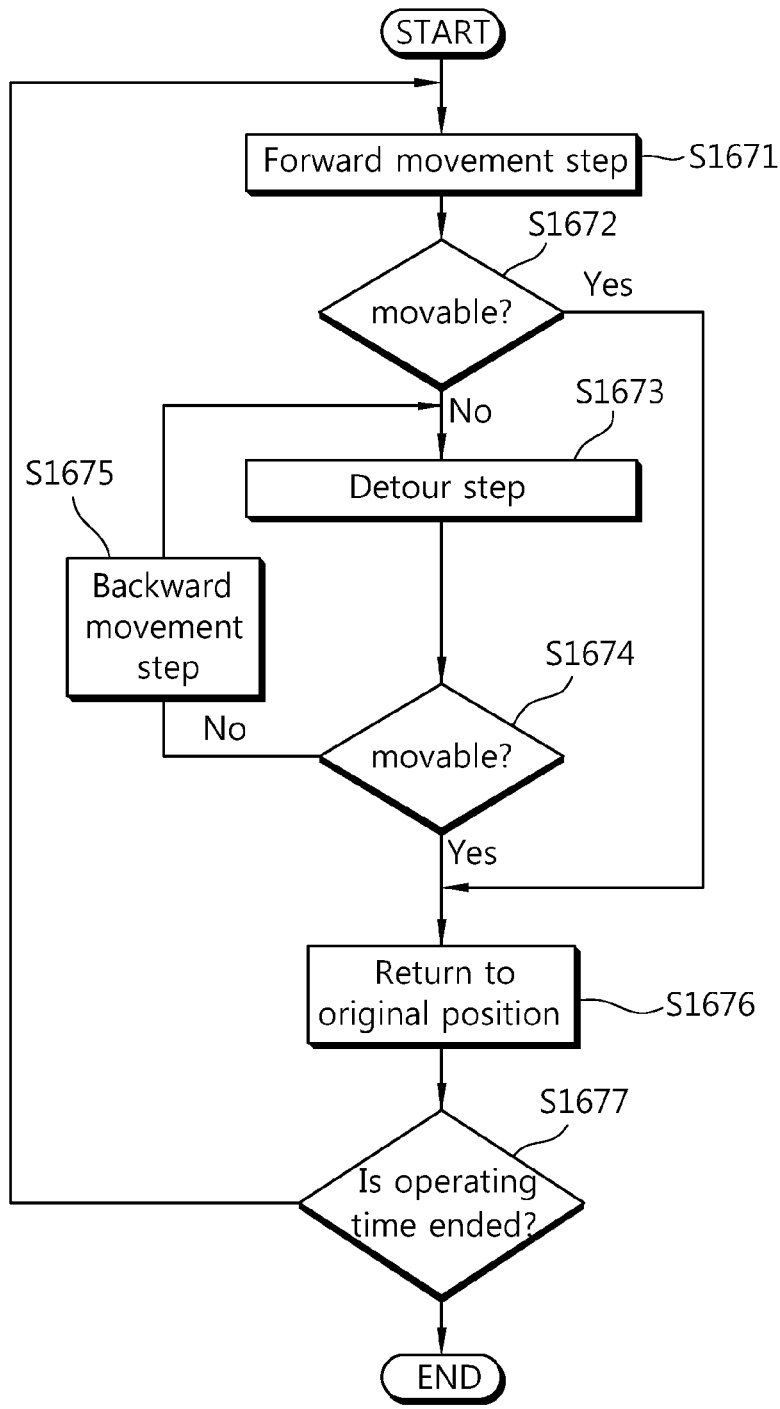
FIG. 18 is a flowchart showing an operation of securing a moving route of the cleaning robot when the cleaning robot is moved according to the automatic cleaning mode in the underwater sediment cleaning method according to the present invention.

FIG. 18 is a flowchart showing an operation of securing a moving route of the cleaning robot when the cleaning robot moves in the automatic cleaning mode in the underwater sediment cleaning method shown in FIG. 14.

Referring to FIG. 18, when the load of the cleaning robot 100 is less than the optimal load, the operation of securing the moving route of the cleaning robot 100 is performed (S167). That is, when the load of the cleaning robot 100 is determined to be less than the optimal load and the moving speed of the cleaning robot 100 is reduced, a forward movement command is inputted to the cleaning robot 100 (S1671).

If the cleaning robot 100 can move according to the forward movement command (S1672), the cleaning robot 100 moves forward. Here, although the cleaning robot 100 moves toward the target point at a speed lower than an input speed value since the cleaning robot 100 is moving forward on the route having a large amount of works, the cleaning robot 100 cannot arrive at the target point. A command of returning to the original position toward the target point is inputted to the cleaning robot 100 moving toward the target point according to the forward movement command, and the cleaning robot 100 moves backward to the original position (S1676).

The forward movement command and the command of returning to the original position are repeated for a predetermined operating time. Accordingly, the cleaning robot 100 can repeat forward movement and backward movement toward the target point on the route having a large amount of works to handle the works.

When the cleaning robot 100 cannot move even though the forward movement command is inputted to the cleaning robot 100 (S1672), a left-turn command or a right-turn command based on the direction to the target point is inputted. The cleaning robot 100 moves to a left or right direction at 30° from the direction to the target point according to the left-turn or right-turn command (S1673).

If the cleaning robot 100 can move according to the left-turn or right-turn command (S1674), the cleaning robot 100 turns left or right according to the left-turn or right-turn command. The command of returning to the original position toward the target point is inputted to the cleaning robot 100 turning left or right, and thus the cleaning robot 100 moves backward to the original position before the forward movement command is inputted thereto.

In this manner, the left-turn or right-turn command and the command of returning to the original position toward the target point are inputted to the cleaning robot 100 that cannot move toward the target point, and thus the large amount of works around the route to the target point is gradually reduced and the cleaning robot 100 becomes a state that the cleaning robot 100 can move toward the target point when the works are handled to some degree by the cleaning robot 100.

When the cleaning robot 100 cannot move even though the left-turn or right-turn command is inputted to the cleaning robot 100 (S1674), the cleaning robot 100 is moved backward from the current location of the cleaning robot 100. Then, the cleaning robot 100 moves backward to a position behind the position where the forward movement command is inputted to the cleaning robot 100 (S1675). When the left-turn or right-turn command is inputted to the cleaning robot 100 moved backward, the cleaning robot 100 turns left or right according to the left-turn or right-turn command (S1673).

In this manner, the backward movement command is inputted to the cleaning robot 100 that cannot move toward the target point and turn left or right to gradually reduce the large amount works around the route to the target point and make the cleaning robot 100 be in a state that the cleaning robot 100 can move toward the target point when the works are handled to some extent by the cleaning robot 100.

The forward movement command (S1671) and the command of returning to the original position toward the target point (S1676) are repeated for a predetermined operating time (S1677). Accordingly, the cleaning robot 100 can repeat forward movement and backward movement on the route having the large amount of works to handle the works.

That is, the cleaning robot 100 having a load determined to be less than the optimal load can repeatedly secure the moving route for the predetermined operating time to handle a large amount of works.

After the lapse of the predetermined operating time (S1677), the cleaning robot 100 returns to the control step S161 and moves to find the target point.

Referring back to FIG. 14, when the cleaning robot 100 reaches the target point in the target point arrival determination step S163, speed values of the left and right wheels for the next target point are inputted to the cleaning robot 100. The cleaning robot 100 moves toward the next target point according to the speed values of the left and right wheels.

When the control step S161 and the moving step S162 are repeated, the cleaning robot 100 can arrive at the final target point (S163). Then, the operation of discharging the contaminated water from the water tank 10 is finished.

Referring back to FIG. 13a, when the manual cleaning mode is selected in the mode selection step S140 (S150), the user can operate the operation console 400 while observing the image photographed by the camera 167 to control the cleaning robot 100.

The contaminated water sucked by the cleaning robot 100 is discharged to the tank 210 of the sediment separator 200. The contaminated water discharged to the tank 210 passes through the filter 240. Here, the sediment contained in the contaminated water is left at one side of the tank 210 and clean water flows to the other side of the tank 210. The sediment left in the tank 210 is discharged to the outside of the tank 210 through the sediment discharge pipe 220 and the clean water flows into the water tank.

The invention claimed is:

1. A cleaning robot comprising:
    a body put into a water tank;
    a driver supporting the body and moving the body;
    a suction part arranged in front of the body and sucking contaminated water containing sediment in the water tank; and
    a tilting part supported by the body to support the suction part and rotating the suction part on an axis corresponding to the direction across the moving direction of the body;
    a supporting frame arranged in front of the body;
    bumper wheels supported by the supporting frame and arranged to roll on an obstruction appearing in front of the body; and
    elevating wheels supported by the supporting frame and arranged to roll on an obstruction appearing under the supporting frame.

2. The cleaning robot of claim 1, wherein the tilting part comprises:
a support supporting the suction part with a front end of the body, being rotatably combined with the body and rotating from the body on a first supporting pin provided in a direction across the moving direction of the body;
a first link joint having a first end connected to the support through a first link pin;
a second link joint having a first end connected to a second end of the first link joint through a second link pin and a second end connected to the body through a second supporting pin, being rotatably combined with the body and rotating on the second supporting pin; and
a tilt cylinder having an output terminal connected to the second link pin.

3. The cleaning robot of claim 2, further comprising a tilt limit sensing part arranged behind the support to sense the lower limit point and the upper limit point of the support.

4. The cleaning robot of claim 1, further comprising a location information sensing part supported by the body and exposed from the surface of water in the water tank.

5. The cleaning robot of claim 1, wherein the supporting frame is rotatably combined with the body and rotating on an axis corresponding to the direction across the moving direction of the body, further comprising a rotation angle sensing part arranged behind the supporting frame to sense the rotation angle of the supporting frame.

6. An underwater sediment cleaning apparatus comprising:
a cleaning robot put into a water tank to suck contaminated water containing sediment in the water tank;
a sediment separator located outside the water tank, receiving the contaminated water from the cleaning robot, filtering the sediment from the contaminated water and discharging clean water obtained by filtering the sediment from the contaminated water to the water tank; and
a controller located outside the water tank and connected to the cleaning robot to control the operation of the cleaning robot
wherein the cleaning robot comprising;
a body put into the water tank;
a driver supporting the body and moving the body;
a suction part arranged in front of the body and sucking contaminated water containing sediment in the water tank; and
a tilting part supported by the body to support the suction part and rotating the suction part on an axis corresponding to the direction across the moving direction of the body;
a supporting frame arranged in front of the body;
bumper wheels supported by the supporting frame and arranged to roll on an obstruction appearing in front of the body; and
elevating wheels supported by the supporting frame and arranged to roll on an obstruction appearing under the supporting frame.

7. The underwater sediment cleaning apparatus of claim 6, wherein the sediment separator comprises:
a tank having a first side connected with a contaminated water discharge pipe extended from the cleaning robot;
an intake pipe having a first end connected to a second side of the tank and a second end opened to the water tank to allow the clean water to flow into the water tank; and
a filter set inside the tank to filter the sediment from the contaminated water flowing to the intake pipe.

8. The underwater sediment cleaning apparatus of claim 7, further comprising a sediment discharge pipe having a first end connected to the first side of the tank and a second end opened to the outside of the tank.

\* \* \* \* \*